Sept. 27, 1932. R. G. WHITLOCK 1,879,967
HAND OPERATED POSTAL MACHINE
Filed Sept. 23, 1929 14 Sheets-Sheet 2

INVENTOR.
*Ralph G. Whitlock*
BY *Townsend, Loftus & Abbett*
ATTORNEYS.

Sept. 27, 1932.　　　R. G. WHITLOCK　　　1,879,967
HAND OPERATED POSTAL MACHINE
Filed Sept. 23, 1929　　　14 Sheets-Sheet 3

INVENTOR.
Ralph G. Whitlock
BY
Townsend, Loftus + Abbett
ATTORNEYS.

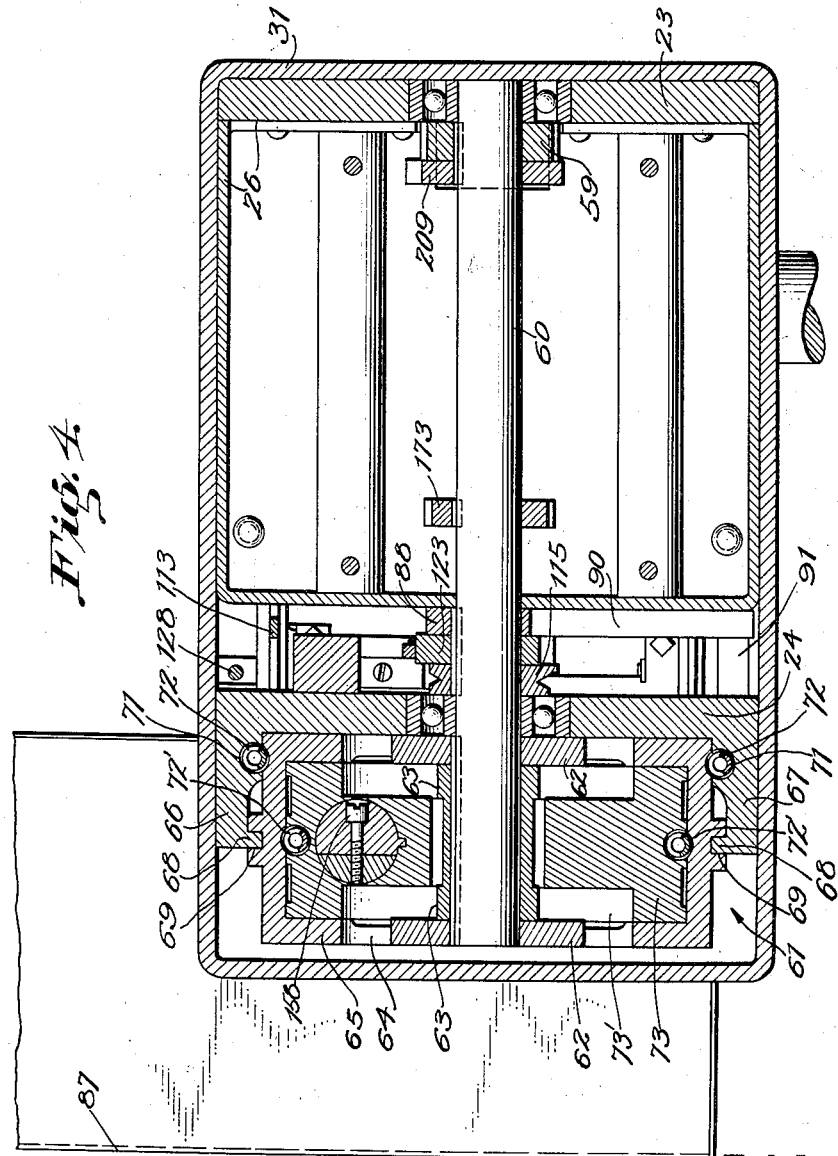

Sept. 27, 1932.  R. G. WHITLOCK  1,879,967
HAND OPERATED POSTAL MACHINE
Filed Sept. 23, 1929  14 Sheets-Sheet 5
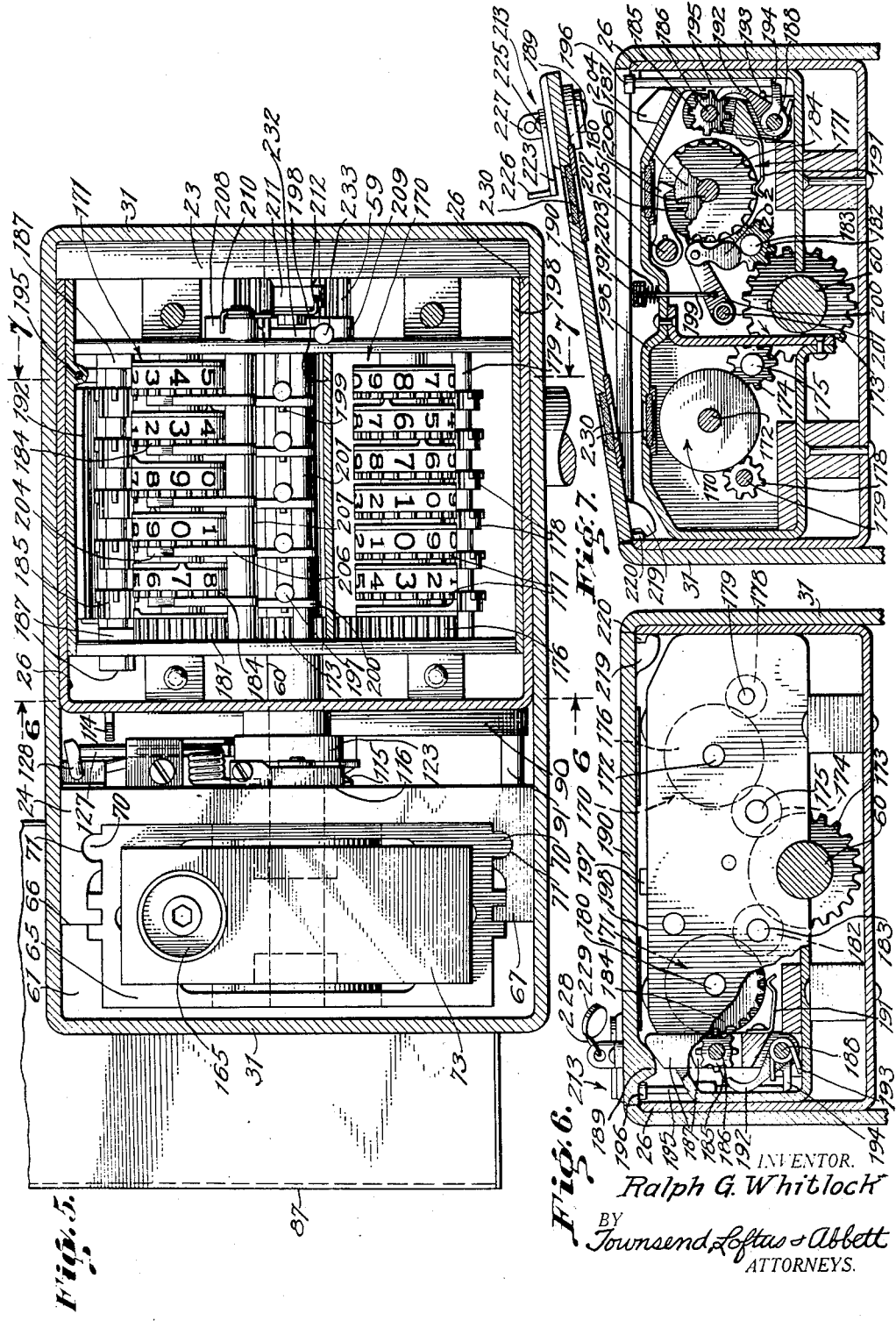
INVENTOR.
Ralph G. Whitlock
BY Townsend, Loftus & Abbett
ATTORNEYS.

Sept. 27, 1932.   R. G. WHITLOCK   1,879,967
HAND OPERATED POSTAL MACHINE
Filed Sept. 23, 1929    14 Sheets-Sheet 6
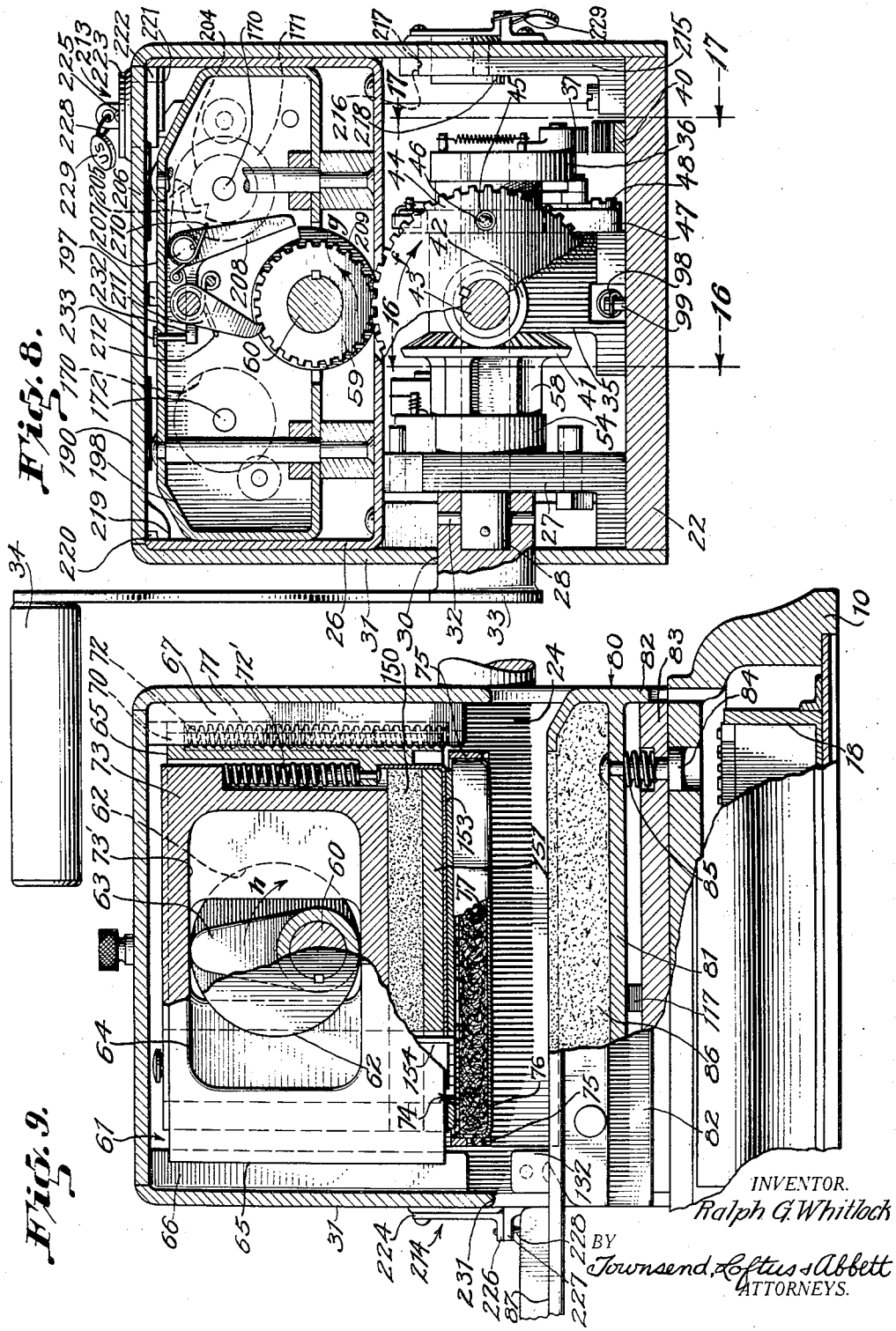
INVENTOR.
Ralph G. Whitlock
BY Townsend, Loftus & Abbett
ATTORNEYS.

Sept. 27, 1932.   R. G. WHITLOCK   1,879,967
HAND OPERATED POSTAL MACHINE
Filed Sept. 23, 1929    14 Sheets-Sheet 7
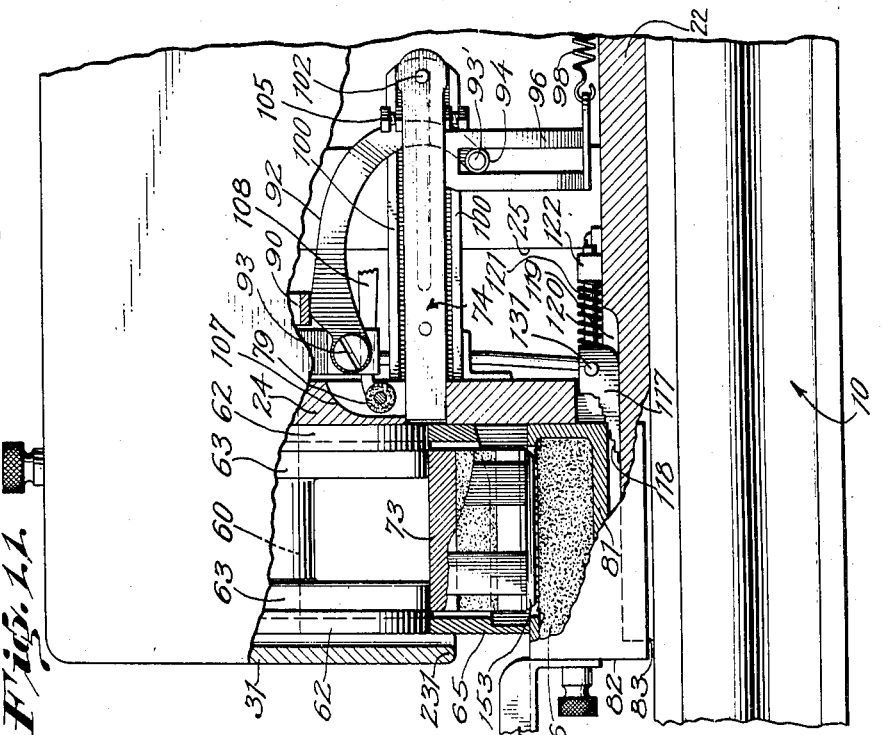
INVENTOR.
Ralph G. Whitlock
BY Townsend, Loftus & Abbett
ATTORNEYS.

Sept. 27, 1932.  R. G. WHITLOCK  1,879,967
HAND OPERATED POSTAL MACHINE
Filed Sept. 23, 1929  14 Sheets-Sheet 8
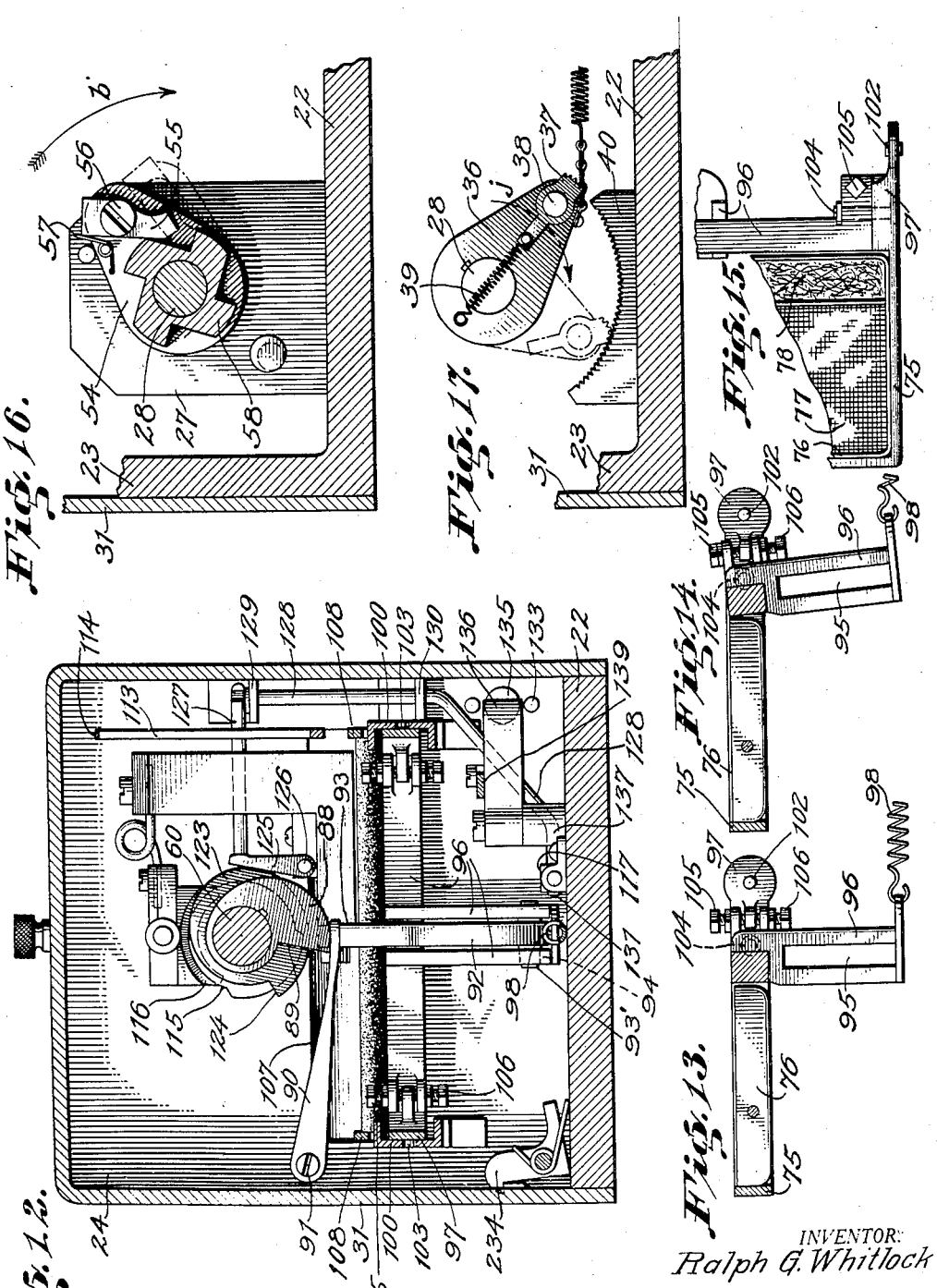
INVENTOR:
Ralph G. Whitlock
BY
Townsend, Loftus & Abbett
ATTORNEYS.

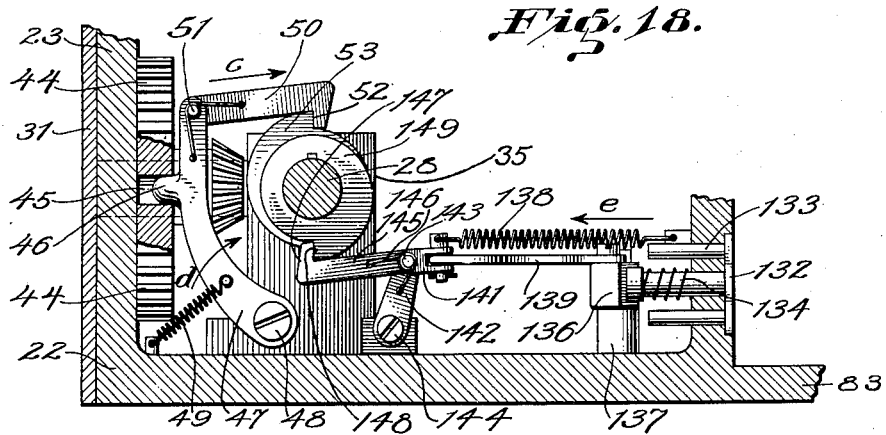
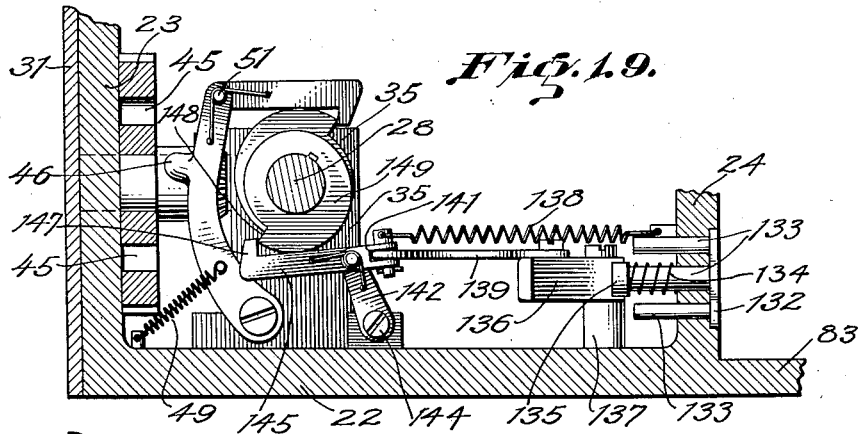
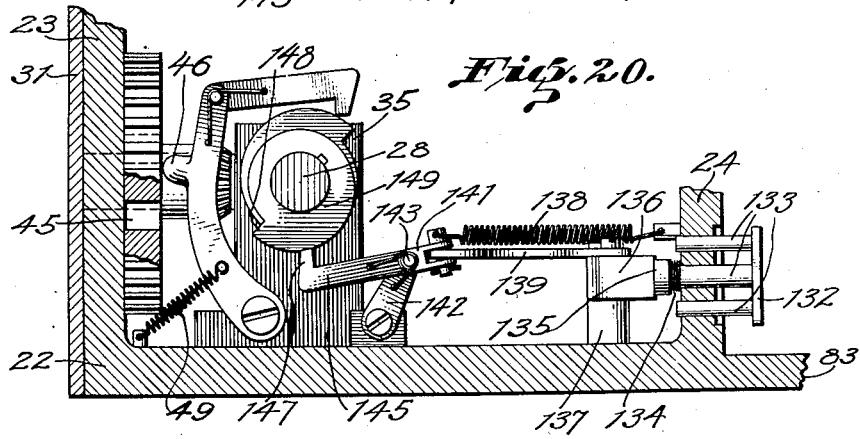

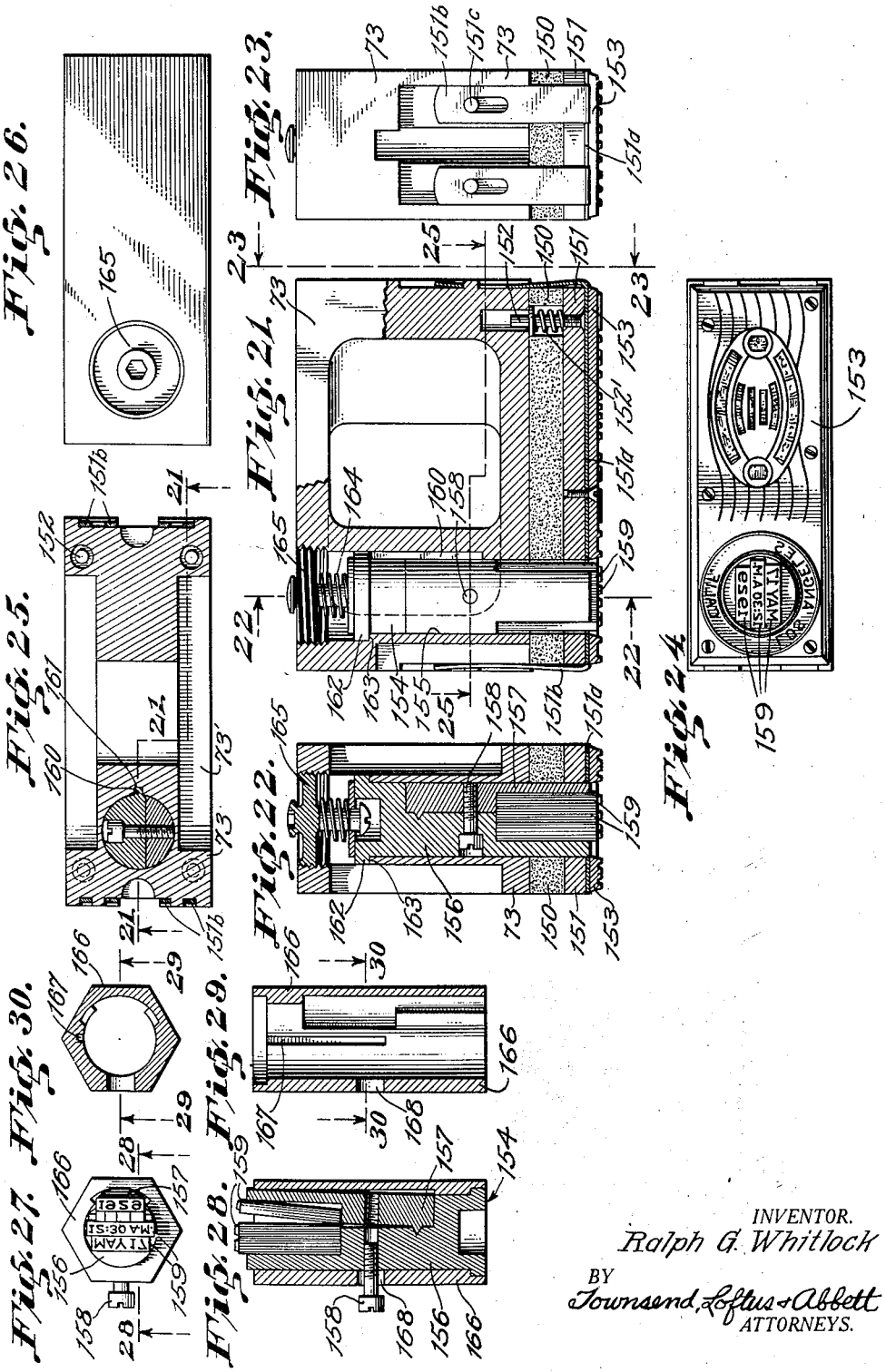

Sept. 27, 1932.  R. G. WHITLOCK  1,879,967
HAND OPERATED POSTAL MACHINE
Filed Sept. 23, 1929    14 Sheets-Sheet 11
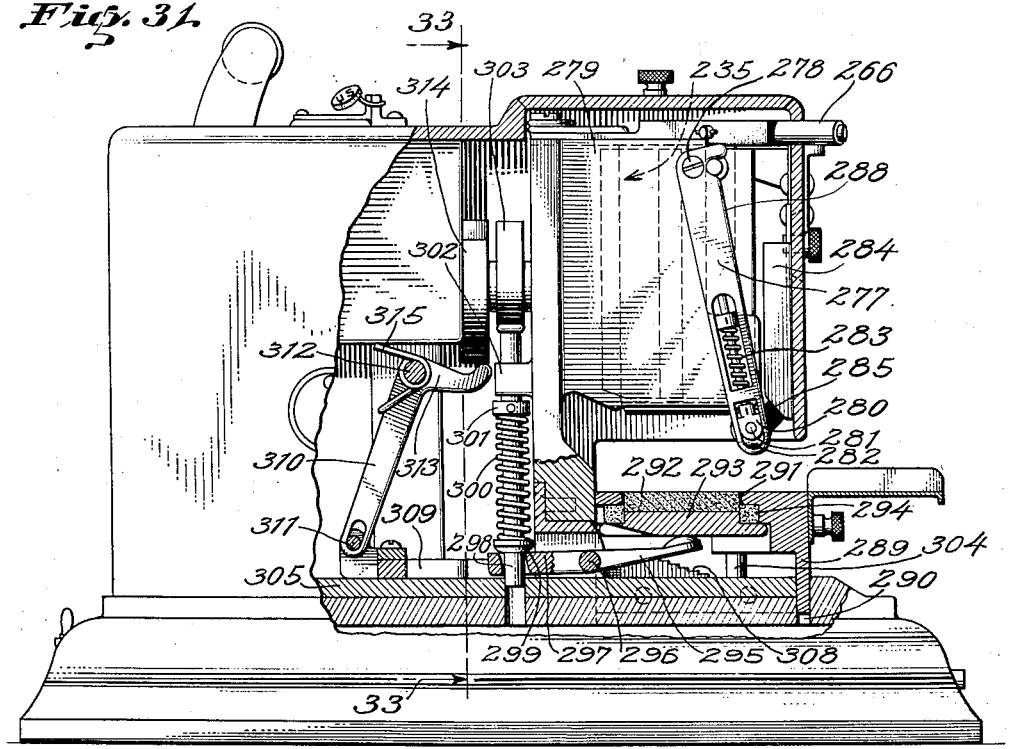
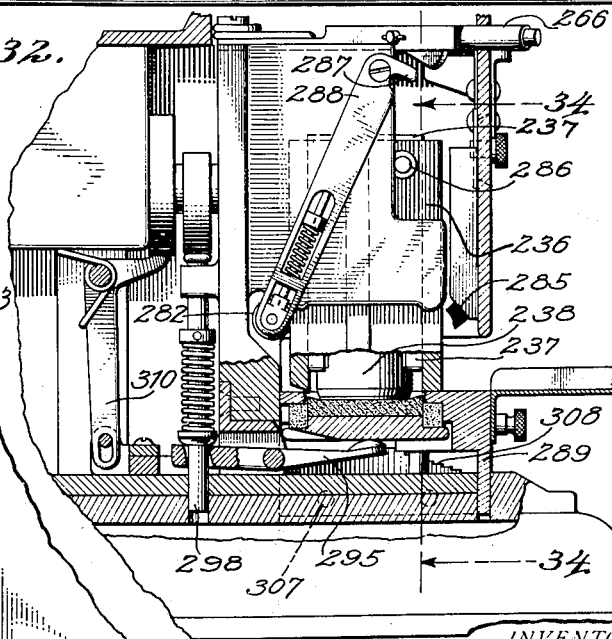
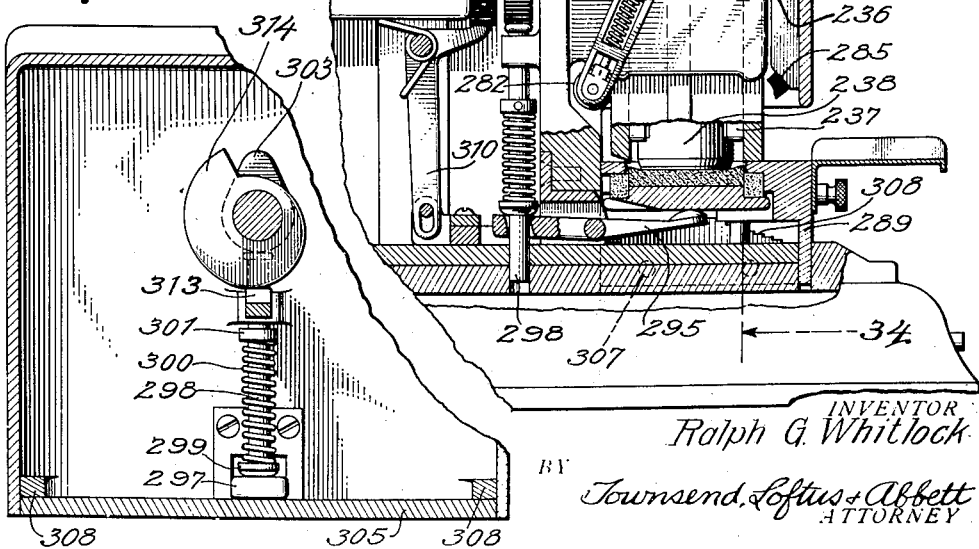
INVENTOR
Ralph G. Whitlock
BY Townsend, Loftus & Abbett
ATTORNEY Sept. 27, 1932.  R. G. WHITLOCK  1,879,967
HAND OPERATED POSTAL MACHINE
Filed Sept. 23, 1929  14 Sheets-Sheet 12
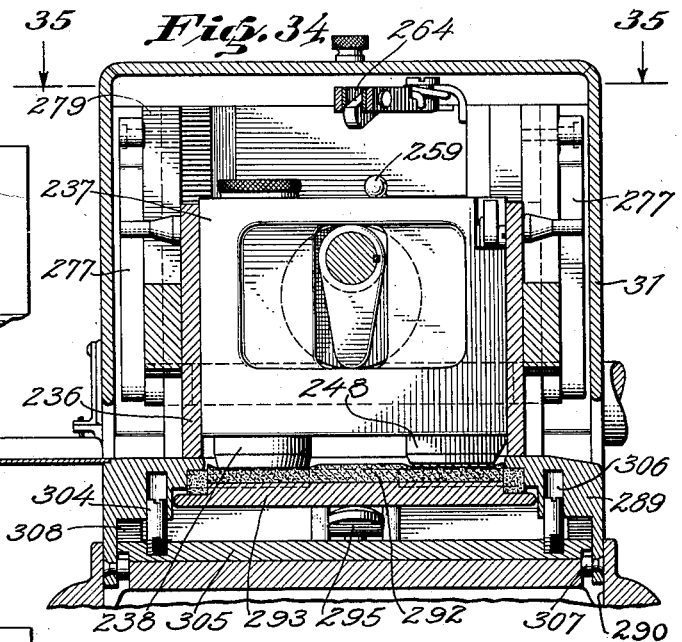
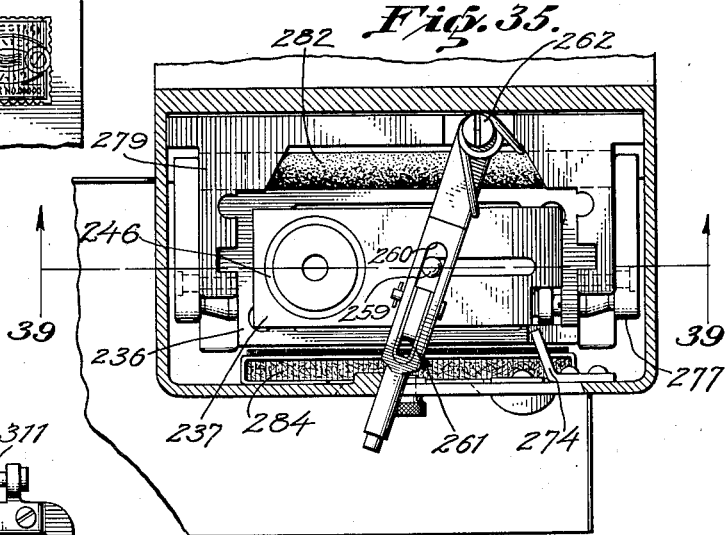
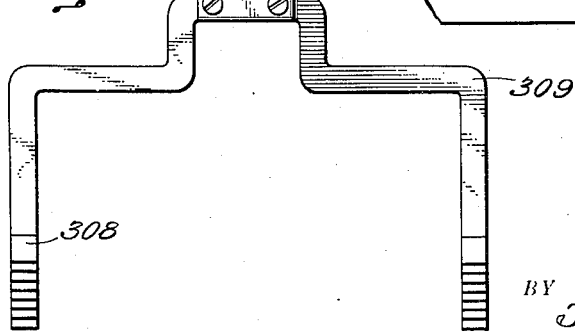
INVENTOR
Ralph G. Whitlock
BY Townsend, Loftus & Abbett
ATTORNEY

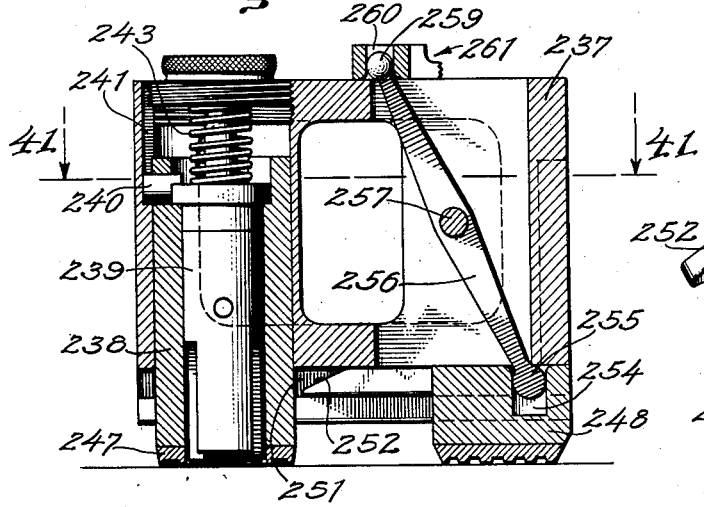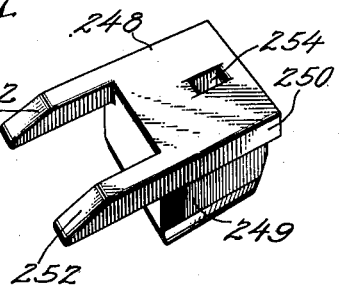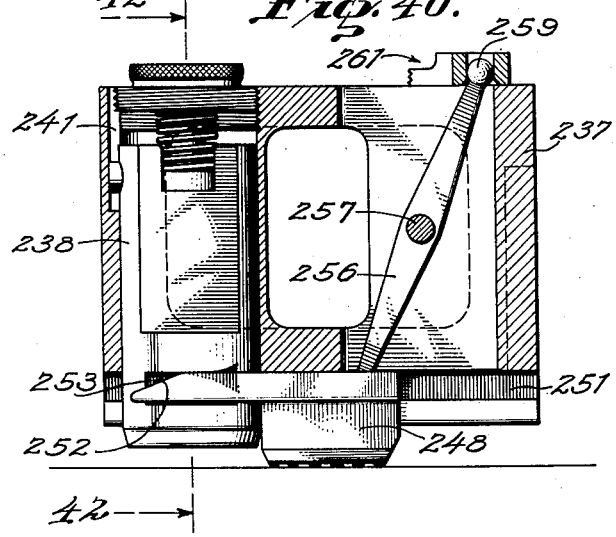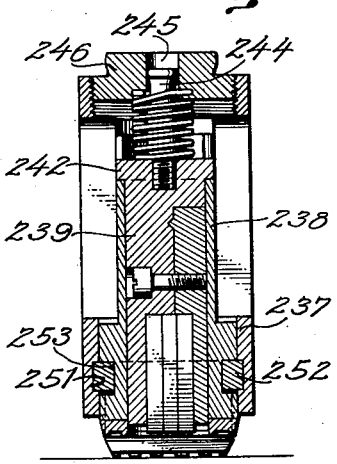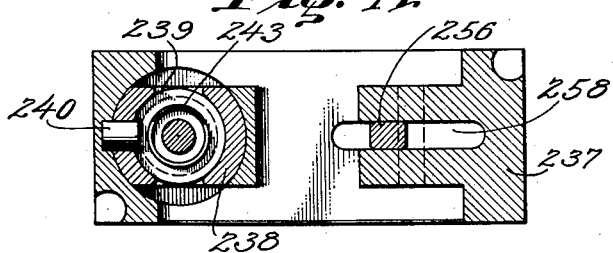

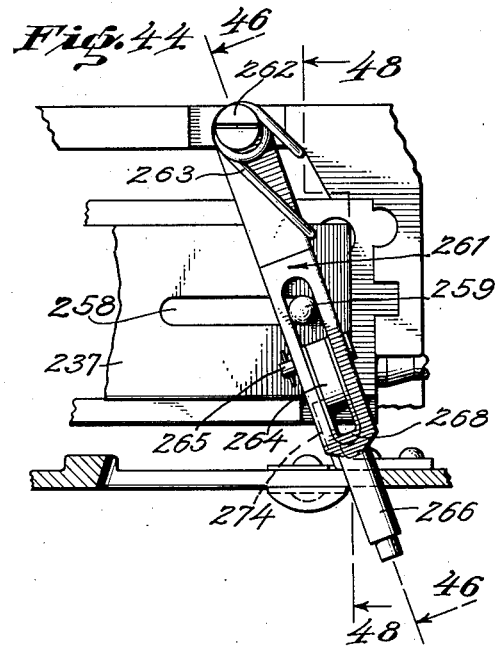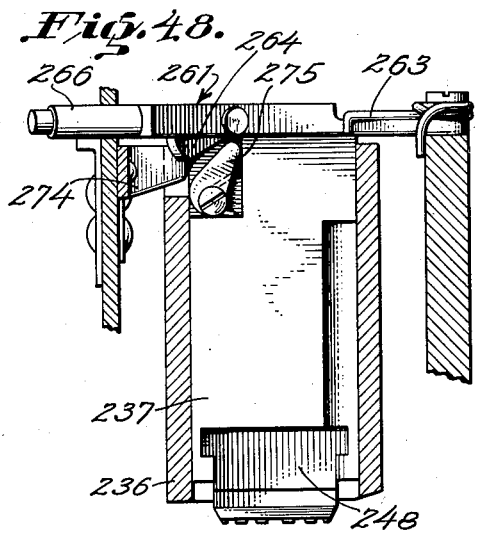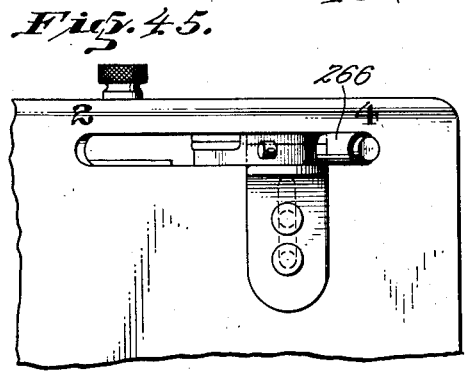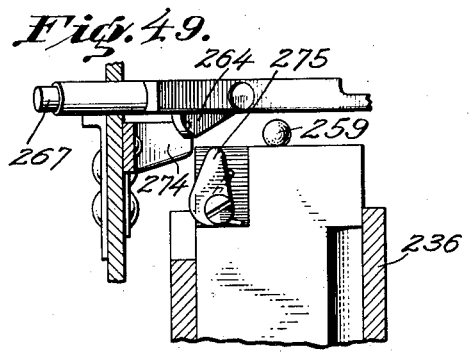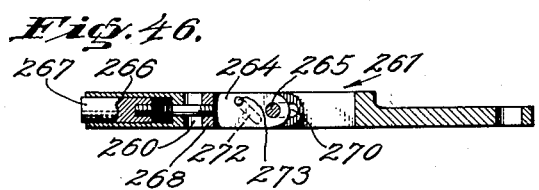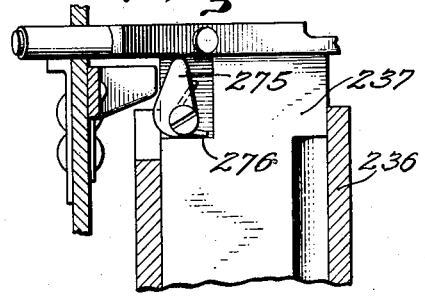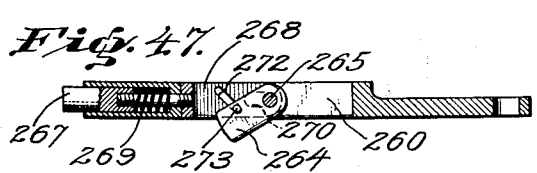

Patented Sept. 27, 1932

1,879,967

UNITED STATES PATENT OFFICE

RALPH G. WHITLOCK, OF LOS ANGELES, CALIFORNIA, ASSIGNOR TO RALPH G. WHITLOCK PATENTS, INC., OF LAS VEGAS, NEVADA, A CORPORATION OF NEVADA

HAND OPERATED POSTAL MACHINE

Application filed September 23, 1929. Serial No. 394,602.

This invention relates to a postal machine and particularly pertains to a manually operated device for engrossing indicia upon a piece of mail matter, in accordance with the provisions of section 452 postal laws and regulations, effective as of the date of April 1, 1927, the structure being of the general design and operation of the machines shown in patents issued to me June 26, 1917 and April 17, 1928, and Numbered 1,230,966 and 1,666,188, respectively, and co-pending applications filed by me June 30, 1925, S. N. 40,631 and May 21, 1929, S. N. 364,828.

It is the principal object of the present invention to provide a postal machine adapted to be operated under a permit issued by the Postal Department of the Government and under government supervision, and which machine will engross a prescribed postal permit upon pieces of mail matter; the operation being controlled and permitted by a meter mechanism in the machine which is set by postal authorities, and will permit the machine to be operated a number of times as represented by the setting of the machine; the structure being extremely simple as to its design and making it possible for the machine to be economically installed in offices having a small amount of daily mail and insuring that the machine may be operated by those not mechanically inclined without danger of breaking the machine.

The present structure also embodies numerous safety features which preclude the possibility of unauthorized or unrecorded actuation of the machine, thus giving postal authorities assurance that the machine cannot be tampered with or misused in a manner to affix the permit upon a piece of mail matter without accounting and paying for the printing of the permit as indicated by the meters.

The present invention contemplates the provision of a platen with relation to which a printing head operates, said head being housed within a sleeve and otherwise normally sealed by an ink pad which covers the printing face of the head and remains in this position until such time as the machine is operated; the platen being yieldable to accommodate mail matter of various thickness and automatically locking to prevent yielding movement after a piece of mail matter has thus been accommodated.

The invention is more particularly described by way of example in the accompanying drawings, in which:

Fig. 4 is a view in horizontal section taken through the machine on line 4—4 of Fig. 2 and particularly showing the printing head operating mechanism and the master shaft.

Fig. 5 is a view in horizontal section through the machine as seen on the line 5—5 of Fig. 2, and particularly showing the details of the permit meter arrangement.

Fig. 6 is a view in transverse vertical section through the meter box as seen on the line 6—6 of Fig. 5, and showing the lid of the meter box closed.

Fig. 7 is a view in transverse section through the meter box as seen on the line 7—7 of Fig. 5, and showing the lid of the meter box opened.

Fig. 8 is a view in vertical section through the machine as seen on the line 8—8 of Fig. 2.

Fig. 9 is a view in partial vertical section through the machine substantially as seen on the line 9—9 of Fig. 2, and showing the printing head arrangement, the ink pad and the platen.

Fig. 10 is a fragmentary view of the forward end of the postal machine with parts broken away to show the relation of the printing head to the ink pad when the downward movement of the head is initiated.

Fig. 11 is a fragmentary view with parts broken away similar to Fig. 10, showing the relation of the printing head to the ink pad and the platen and showing the platen in its locked position.

Fig. 12 is a view in transverse vertical section as seen on the line 12—12 of Fig. 2, particularly showing the ink pad mounting and the actuating means therefor, associated with the master shaft.

Fig. 13 is a fragmentary view showing the tilting adjustment of the ink pad frame with the parts concerned shown as being disassociated from the machine.

Fig. 14 is a view similar to Fig. 13 showing the frame and its operating arm angularly adjusted with relation to each other.

Fig. 15 is a view in plan showing the ink pad mounting as seen in Figs. 13 and 14.

Fig. 16 is a fragmentary view of the operating ratchet as seen on the line 16—16 of Fig. 8.

Fig. 17 is a view showing the jack pawl structure carried by the operating shaft as seen on the line 16—16 of Fig. 8.

Fig. 18 is a fragmentary view in vertical section showing the master lock and the envelope kick-out mechanism as seen on the line 18—18 of Fig. 3.

Fig. 19 is a view similar to Fig. 18 showing the master lock as released, and the kick-out mechanism in position for operation.

Fig. 20 is a view similar to Fig. 19 showing the kick-out mechanism as released.

Fig. 21 is a view in vertical section through the printing head along the line 21—21 of Fig. 25 showing the relation of the removable printing frame with the permit printing plate.

Fig. 22 is a view in vertical section taken transversely of the printing head, shown in Fig. 21 along the line 22—22 of Fig. 21.

Fig. 23 is a view in end elevation showing the printing head structure as seen on the line 23—23 of Fig. 21.

Fig. 24 is a view in plan showing the printing plate and the removable printing face therein.

Fig. 25 is a view in horizontal section through the printing head as seen on the line 25—25 of Fig. 21.

Fig. 26 is a view in plan showing the printing head.

Fig. 27 is a view in end elevation showing the removable printing frame and the type therein placed in a holding sleeve.

Fig. 28 is a view in vertical section through the removable printing frame with the clamp member released, whereby the type may be removed or interchanged.

Fig. 29 is a view in vertical section through a sleeve within which the removable type frame is positioned while setting type.

Fig. 30 is a view in transverse section through the sleeve as seen on the line 30—30 of Fig. 29.

Fig. 31 is a fragmentary view in vertical section and elevation showing a modified form of the invention in which a construction of the inking means is provided, said view showing the inking roller in its advanced position.

Fig. 32 is a fragmentary view in section and elevation showing the inking structure of Fig. 31 with the inking roller in its detracted position.

Fig. 33 is a view in section and elevation taken along the line 33—33 of Fig. 31 and showing the positive platen moving mechanism.

Fig. 34 is a view in transverse section and elevation as seen on the line 34—34 of Fig. 32 and as showing the printing head equipped with means for increasing the value of the printed permit.

Fig. 35 is a fragmentary view in plan as seen on the line 35—35 of Fig. 34 showing the additional permit shifting mechanism.

Fig. 36 is a fragmentary view showing the corner of an envelope with a permit of one denomination printed thereon.

Fig. 37 is a fragmentary view of the corner of an envelope showing additional permit indicia printed thereon, whereby the amount of postage is increased.

Fig. 38 is a view in plan showing the lock fork for the platen.

Fig. 39 is an enlarged view in vertical section showing the printing head and the shifting type unit as seen on the line 39—39 of Fig. 35.

Fig. 40 is a view in transverse section and elevation showing the structure disclosed in Fig. 39, but showing the manner in which the type-holder is locked in an inoperative position where the auxiliary printing member is shifted to a printing position.

Fig. 41 is a view in horizontal section through the printing head as seen on the line 41—41 of Fig. 39.

Fig. 42 is a view in vertical section through the typeholder of the printing head as seen on the line 42—42 of Fig. 40.

Fig. 43 is a view in perspective showing the lock member for the type-holder, as being integral with the permit printing block.

Fig. 44 is an enlarged fragmentary view in plan showing the permit shifting means of the printing head.

Fig. 45 is a view in elevation showing the shifting lever of the structure disclosed in Fig. 44.

Figs. 46 and 47 are views in longitudinal section through the shifting member as seen on the line 46—46 of Fig. 44 and as indicating the latch member in its operative and inoperative positions.

Fig. 48 is a view in vertical section and elevation as seen on the line 48—48 of Fig. 44 and shows the shifting lever in one position.

Fig. 49 is a fragmentary view similar to Fig. 48 showing the parts in a different position.

Fig. 50 is a view similar to that shown in Fig. 48 with the parts in a released position.

Figure 1:
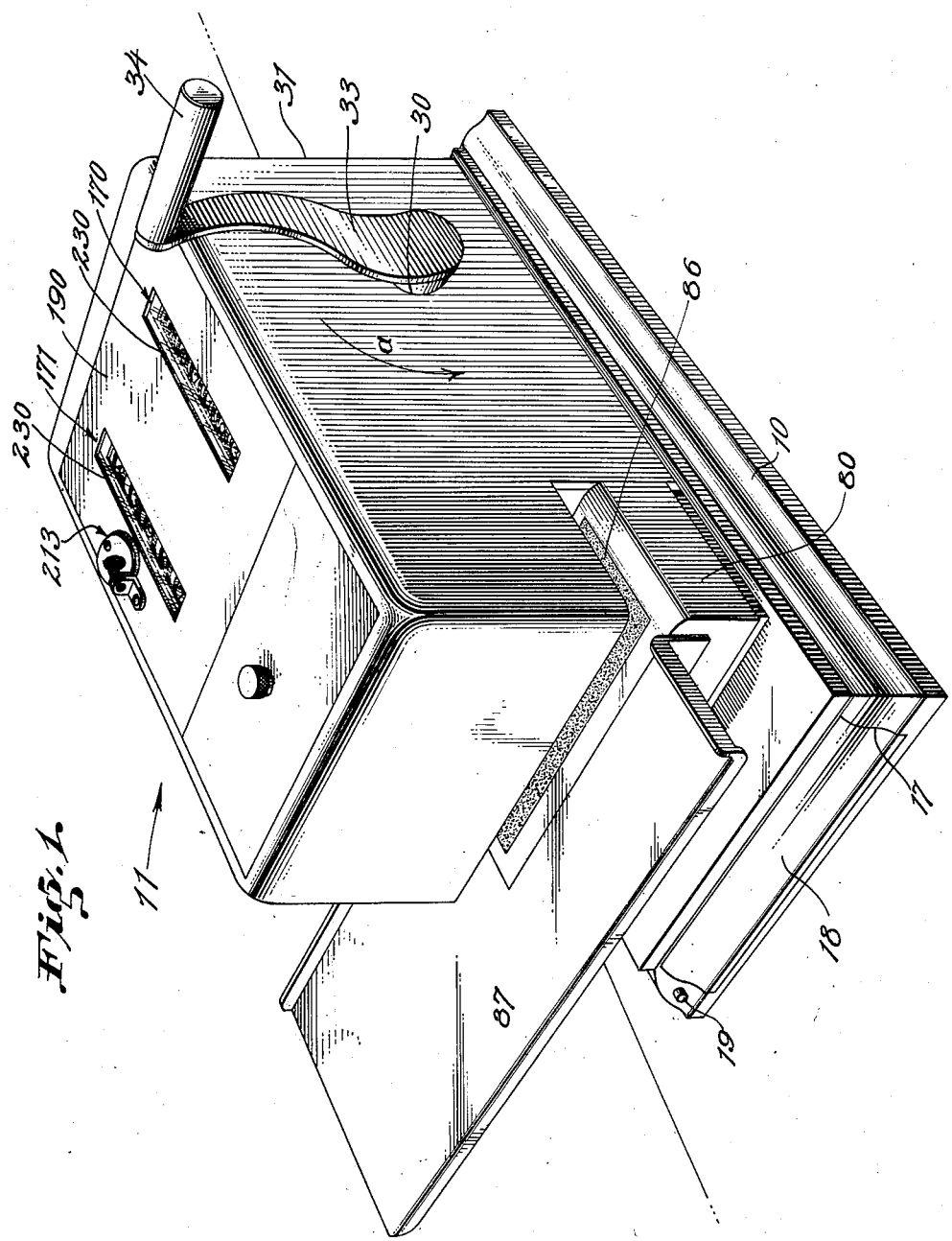
Fig. 1 is a view in perspective showing the completely assembled machine with which the present invention is concerned.
Figure 2:
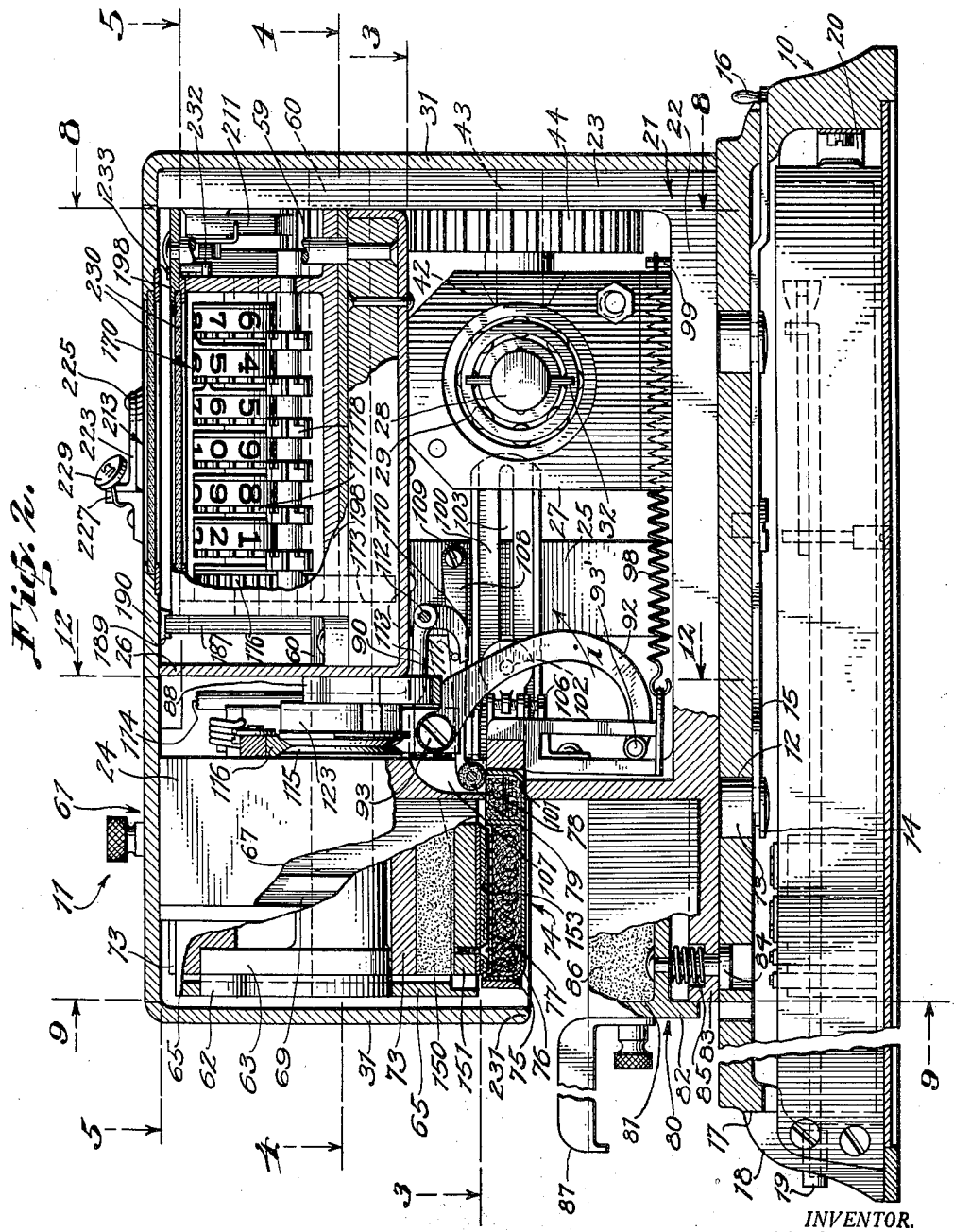
Fig. 2 is a view in vertical section through the machine with parts broken away.

Referring more particularly to Figs. 1 and 2 of the drawings, 10 indicates a base upon which the postal machine 11 is detachably secured. The base may be of any desired construction, but is here shown as having a horizontal face upon which the postal machine unit may rest, and which face is provided with a plurality of perforations 12, through which pins 13 extend. These pins are formed with an annular recess 14 to receive a connection 15 operated by a lock lever 16. By this arrangement the postal units may be readily interchanged so that mail requiring postage of different denominations may be set up for use.

For the sake of convenience the forward end of the base is cut away at 17 to accommodate a drawer 18, within which a suitable font of type and operating tools may be stored. A latch 19 is provided to release the drawer 18 and to permit it to be moved forwardly by a suitable spring 20, shown in Fig. 2 of the drawings.

The postal unit which is mounted upon the base comprises a frame structure 21. This frame includes a base plate 22, which rests upon the upper face of the base 10, and carries a rear bearing upright 23 and a front bearing upright 24. Disposed intermediate these uprights are supporting posts 25 and the meter box 26. Mounted at a point between the supporting posts 25 and the rear bearing upright 23 is a bearing bracket 27 through which an operating shaft 28 extends. This shaft extends horizontally, and is carried within a roller bearing structure 29. The outer end of the shaft projects through an opening 30 in the side wall of the postal unit housing 31. This end of the shaft is provided with radially extending pins 32 which fit within a recess in an operating crank 33, having a handle 34. The handle is designed to oscillate and to swing from a substantially vertical position to a horizontally aligned position as the machine is actuated.

The shaft 28 extends horizontally and transversely of the postal machine and extends through a supporting bearing 35 adjacent its opposite end. The projecting end of the shaft carries a check structure as particularly seen in Fig. 17 of the drawings. This structure includes a radially extending arm 36 on the outer end of which is a knurled faced pawl 37 mounted upon a pivot pin 38 carried by the arm 36. A spring 39 normally holds the pawl in a radially aligned position with the operating shaft 28, and permits yielding movement of the pawl as it moves along an arcuate sector 40, which has an arcuate knurled face struck upon an arc concentric with the axis of the shaft 28. This is provided to prevent reverse rotation of the shaft 28 until a complete actuation of the machine has been accomplished, at which time the pawl 37 will move free of the end of the sector 40 and may then swing in an opposite direction and return to its original position. An operating arm 54, (Figs. 3 and 16) is provided to rotate a beveled gear 41 which is freely mounted upon the shaft 28 and is to be actuated after the machine has been unlocked, as will be hereinafter described.

The gear 41 is in mesh with the gear 42 carried by a jack shaft 43, extending longitudinally of the machine and at right angles to the axis of the operating shaft 28. This shaft is secured with relation to the rear bearing upright 23, and rotatably supports the bevel gear 42 and a master spur gear 44 secured thereto and adapted to move therewith.

The lock mechanism of the entire machine operates upon the spur gear 44, the construction being shown in Figs. 18 to 20, inclusive, of the drawings. Here it will be seen that an opening or recess 45 is formed in the face of the gear 44 to receive a lock lug 46 carried by a lock lever 47. This lever is pivotally mounted upon a screw 48 fastened to bearing block 35. Lock lever 47 is designed to swing in a vertical plane toward and away from the face of the gear 44, and is normally held in contact therewith by a tension spring 49. The free end of the lever carries a detent 50 pivoted thereto by a pin 51. This detent normally hooks over a shoulder 52 on a cam 53. The cam is carried by and keyed to the operating shaft 28. The cam is formed with a gradually swelling eccentric portion terminating in a radial shoulder over which the end of the detent may hook and which swell portion will gradually lift the detent from engagement with the shoulder 52 and release the lock lever after it has acted to withdraw the lock lug 46 from the opening 45 in the gear. It is intended that this release of the gear by the cam 53 on the operating shaft 28 shall precede any operation in the machine with the exception of the non-reversing mechanism as shown in Fig. 17 of the drawings, which will instantly operate when the crank is moved to prevent any reverse motion of the crank until a complete cycle of operation has been carried out.

The rotation of the bevel gear 41, bevel pinion 42 and the gear 44, will follow the release of the gear 44 by movement of the lug 46 and will be brought about by continued rotation of the shaft 28, upon which radial arm 54 is keyed. This arm carries a detent 55 pivoted thereupon at 56 and normally held with its operative end forced inwardly by a spring 57. This detent rests against one of a series of ratchet teeth 58 formed as part of the hub or the gear 41, which gear is freely mounted to rotate on shaft 28. This structure is particularly shown in Fig. 16 of the drawings, where it will be seen that there are four ratchet teeth 58 with their operating faces at right angles to each other so that the engagement of one tooth will produce a one-quarter revolution of the gear 41 at each actuation of the crank 33.

When the gears 41, 42 and 44 are set in motion by the rotation of gear 41, pinion 59 will be rotated as shown in Fig. 8. This pinion is mounted upon the master shaft 60 disposed with its axis parallel to the axis of shaft 43 and in substantially the same vertical plane therewith. The pinion is rotatably mounted at its opposite ends in the upright bearing members 23 and 24, thus extending through the meter box 26 and the printing well 61. The forward end of the master shaft 60 carries a pair of sleeve cams 62, and a pair of printing head cams 63. The sleeve cams are outermost in the group and are circular eccentric cams, operating in rectangular cam openings 64 in the front and rear walls of the sleeve 65, as shown in Figs. 4 and 9. This sleeve is designed to be vertically reciprocated by the eccentric cams 62, and is supported by the brackets 66 and 67 at the opposite sides of the sleeves, and which brackets are vertically parallel and are fastened to the forward bearing upright 24.

The brackets are formed with a tongue 68 which extends into a vertical groove 69 formed centrally of the ends of the sleeve to guide the same in its vertical path of travel. Tongues 70 project from the sleeve and fit into vertical grooves 71 in the bracket plates 66 and 67. These tongues are circular in section and fit into grooves of similar contour so that the parts cannot be separated or dismantled by unauthorized persons.

Disposed in the grooves 71 and beneath the tongues 70 at the opposite end of the sleeve 65 are springs 72 which cushion the downward movement of the sleeve and prevent violent or abrupt operation which might break the machine or wedge its parts so that they would not be operative.

The printing head cams 63 operate in rectangular openings 73, formed in the opposite vertical faces of the printing head 73. The cams 63 are in the shape of radial throw arms, and are so designed as to insure that the sleeve 65 will move downwardly in advance of the printing head so as to contact with the face of the matter to be printed and will recede into the sleeve before the sleeve raises from the face of the printed matter to insure that the printing plate of the printing head will at all times be embraced by the lower wall of the sleeve when an inking pad, to be hereinafter described, is retracted from its guarding position. The details of the construction of the printing head will be hereinafter described.

The printing face of the printing head is normally covered by an ink pad structure 74 which includes a frame 75, and an ink pad tray 76. Within this tray is a suitable pad 77, adapted to receive ink.

As shown in Fig. 2 of the drawings, an ink compartment 78 is included within the tray and ink from said compartment may be applied to the surface of the pad 77 as the tray is retracted by an inking roller 79, which tends to dip into the ink compartment at the rear of the tray, and then to press against the surface of the pad 77 as the pad moves therebeneath. The frame 75 of the ink pad extends upwardly above the inking surface of the pad and as clearly shown in Fig. 9 of the drawings, provides a marginal flange projecting above the printing face of the printing head, so that it would be impossible to insert an article to be printed between the printing face and the pad, thus under normal conditions the frame 75 of the ink pad guards the printing head.

Disposed beneath the printing head is a platen 80, which includes a frame 81 having a downwardly projecting flange 82. This flange extends around the two ends and the forward side of the structure and overlaps a projecting portion 83 of the base plate 22 of the postal machine frame. The platen is fastened to the member 83 by bolts or rivets 84 and is yieldably supported by coil springs 85 which circumscribe the bolts or rivets and permit downward yielding movement of the platen to accommodate pieces of mail matter of varying thickness. The frame encloses a yieldable pad structure 86 which is intended to provide a soft and yielding surface for the mail matter to insure that the printing head will make a clear printing impression.

A supporting floor 87 is secured to the frame of the platen with its upper surface in the same plane with that of the platen, thus providing a platform of sufficient size to accommodate and support the article of mail matter being printed.

The ink pad 77 and its frame 75 are horizontally reciprocated by rotation of the ink pad shifting cam 88 mounted upon the master shaft 60 as particularly shown in Fig. 12 of the drawings. This cam has an eccentric swell on its periphery which terminates in a straight radial shoulder 89. The cam rests against a pressure lever 90 pivoted at the edge of the frame member 24 upon a pivot 91 and which lever extends transversely of the longitudinal axis of the master shaft 60. The free end of the pressure lever 90 rests upon a shifting lever 92 which is pivoted at 93 and swings longitudinally of the machine. This lever is arcuate in shape and at its lower free end carries a pin 93 upon which a roller 94 is mounted. This roller operates in a vertical slot 95 of a shifting bracket 96 which extends downward from and is secured to arms 97 formed as rear extensions of the ink pad frame 75. Tension spring 98 is fastened by its forward end to the lower end of the bracket 96, and is secured upon a pin 99 at its rear end whereby the spring will tend at all times to retract the pad from its position beneath the printing head and in register therewith. The advance position of the pad and the associated operating parts, including the shifting lever 92, is clearly shown in Fig. 2 of the drawings, while the retracted position of the pad and the shifting lever 92 is shown in Figs. 10 and 11 of the drawings.

The ink pad frame 75 is guided along its horizontal path of travel by guides 100 extending along the opposite sides of the frame and secured to the front bearing upright 24 and the posts 25, through an opening 101 in which upright the pad may pass.

The rear extensions 97 of the frame 75 carry pins 102 which slide in grooves 103 of the guides 100. It will thus be evident that the printing pad frame may have slightly vertical pivotal movement with relation to the axis of the pins 102, as it reciprocates. This movement is utilized to insure that the pad will move under the printing head when the printing head is in its retracted position, and that it will be forced upwardly to contact with the type of the printing head to act as a guard therefor, and at which time the marginal lip of the frame 75 will circumscribe the downwardly projecting plate of the printing head to prevent articles to be printed from being inserted between the pad and the printing head.

In order to insure that the pad will firmly coincide with the type of the printing head, an adjustment is provided between the frame 75 and the bracket 96, as clearly shown in Figs. 13 and 14 of the drawings. Here it will be seen that the frame and bracket are pivoted together upon pins 104, and that adjusting screws 105 and 106 are provided to change the angular relation of the frame 75 with the bracket 96. It will thus be evident that in the event the pad frame 75 and the bracket 96 are adjusted at an angle greater than 90 degrees with relation to each other, that the roller 94 will move the pad upwardly against the face of the printing head with greater force than would be the case if the angular relation of the members were reduced to 90 degrees or less.

Figure 3:
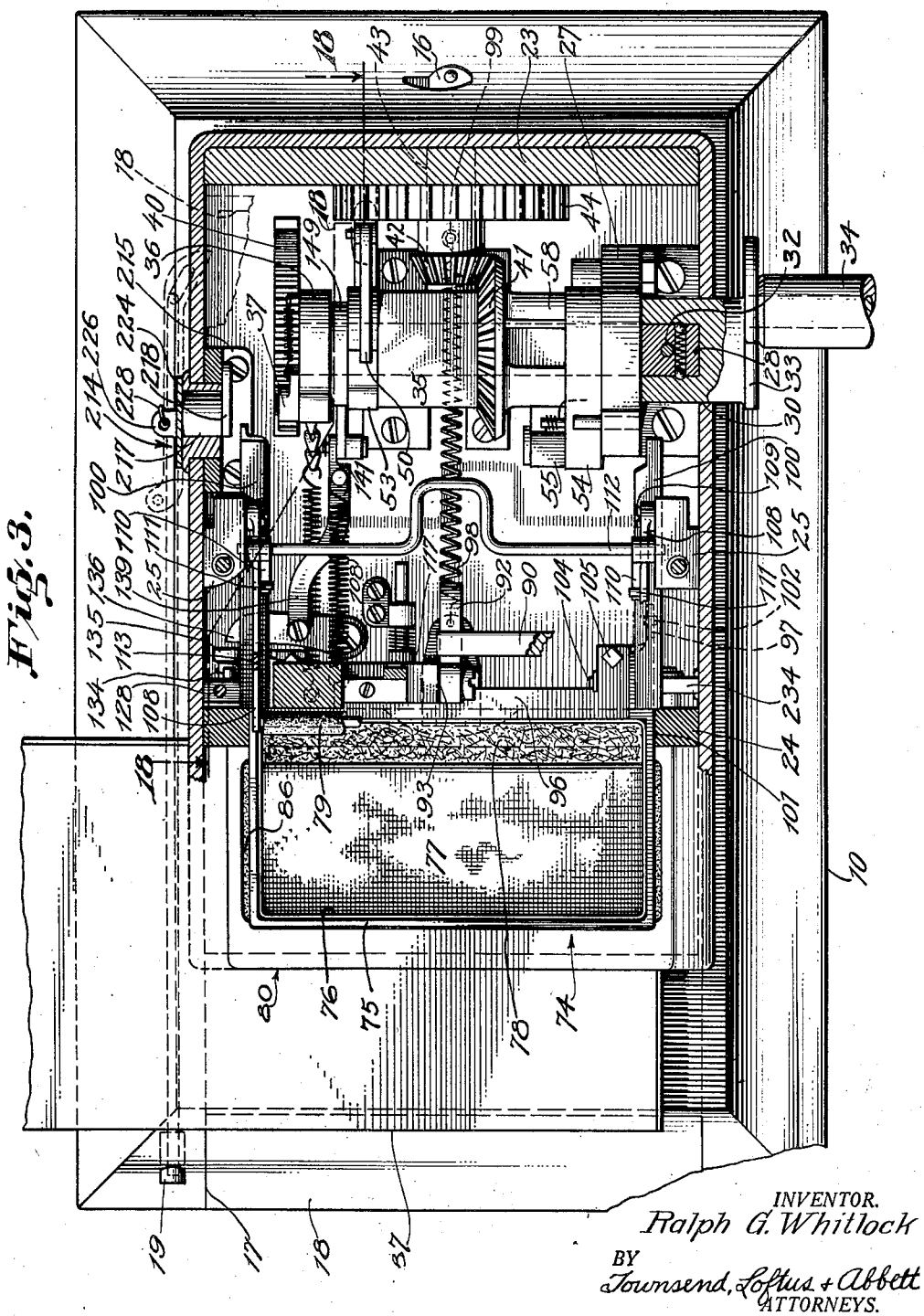
Fig. 3 is a view in horizontal section through the machine as seen on the line 3—3 of Fig. 2, and showing the operating shaft and the ink pad shifting mechanism.

The ink compartment 78 of the ink pad structure is shown in Figs. 2 and 3 of the drawings, as normally extending partially through the opening 101 in the forward bearing upright 24. A recess 107 is formed in the upright 24 above the opening 101, and across the ink roller 79. This roller is mounted upon bearing arms 108, which are pivoted upon screws 109 fastened to the supporting posts 25, which permit the roller to freely rest upon the upper face of the pad 77, as the pad passes beneath it.

To regulate the amount of ink applied to the pad of the roller, this may be adjusted by a regulating finger 110 which extends beneath a pin 111 carried by the roller supporting arms 108. The finger 110 is mounted upon a pivot pin 112 and is adapted to swing with an operating finger 113 which extends forwardly beneath the meter case 26, and then upwardly along the side of the upright 24 to terminate in a thumb operating grip 114.

In order to prevent violent rotation of the master shaft a V-shaped brake drum 115 is secured upon the master shaft 60, and is engaged by a V-shoe 116 which is supported from the upright 24 and is held down into frictional engagement with the drum by suitable pressure means.

As previously described, the platen 80 is resiliently mounted so that it may yield in a manner to permit articles of varying thickness to adjust themselves beneath the printing head so that the upper face of the article to be printed will be in the plane of the printing plate, irrespective of varying thickness of the article of mail matter or whether or not it may be thicker at one end or edge, or some other part thereof. It will thus be evident that due to the yielding support provided for the platen, the movement of the machine may be arrested at the lowermost point in the stroke of the printing head, and that thereafter the platen may be forced downwardly and held while pieces of mail matter are inserted beneath the printing face and forced upwardly to obtain an impression. In order to prevent the unauthorized and criminal use of the machine, means are provided for automatically locking the platen so that it cannot be forced downwardly after it has assumed an adjusted position with relation to a piece of mail matter, to be printed. This structure is shown in Figs. 10, 11 and 12 of the drawings where it will be seen that a wedge 117 is mounted on the floor 22 of the frame and may slide horizontally, to locking position beneath the platen frame 81. In Fig. 10 the wedge is shown in a retracted position, while Fig. 11 shows it as being forced forwardly and with a serrated inclined face 118 beneath the edge of the frame 81, thus preventing further downward movement of the platen frame 81. The wedge 117 is slidable in a groove 119 and is forced forwardly by an expansion spring 120, mounted upon a stem 121 which stem slides through a guide bearing 122. Retraction of the wedge 117 is brought about by a cam 123 which is mounted upon the master shaft 60, adjacent the ink pad operating cam 88. The cam 123 has an eccentric swell upon it terminating in a radial shoulder 124. This cam acts against an arm 125, mounted upon a pivot 126. The free end of the arm forces the rod 127 outwardly. This rod reciprocates through suitable bearings and rotates a vertical rod 128, which is mounted in bearings 129 and 130; the lower end of this rod is bent inwardly and downwardly as shown in Fig. 12 of the drawings, and has an extension 131 which projects into an opening in the wedge 117; thus when the rod is rotated on its vertical axis it tends to move the wedge 117 rearwardly against the compression of the spring 120, and to thus move the wedge to an unobstructing position with relation to the platen frame 81, whereby the platen may be free to move downwardly and accommodate a piece of mail matter.

It is desired that the machine will automatically discharge a piece of mail matter which has been previously printed, and for that purpose a kick-out structure is provided. This is particularly shown in Figs. 3 and 18 to 20, inclusive, of the drawings. The structure includes a plate 132 which normally lies flush with the front face of the upright bearing support 24 and carries a plurality of pins 133 by which it is reciprocably mounted through guide openings in the bearing upright 24. The central pin of the set is formed with a head, and an expansion spring 134 is mounted upon this pin and interposed between the back face of the bearing upright 24 and the head. This enlarged head portion 135 is intended to be struck by a hammer 136. The hammer is shown in Fig. 3 of the drawings, as being mounted upon a vertical pivot pin 137 and to be normally held under tension by a spring 138. An operating rod 139 is pivoted to the hammer at one end and is secured to a shackle 141 at its opposite end. This shackle is pivoted to a rocker arm 142 by a pin 143. The rocker arm is suitably mounted upon a horizontally extending shaft 144 carried on the base 22 of the frame, and adapted to swing in a plane longitudinally of the postal machine, and the rocker arm 142 carries a catch 145, which is mounted upon the pivot 143 and is normally held upwardly by a spring 146. This catch has a hooked end 147 which engages a shoulder 148 of a kickout cam 149 mounted upon the jack shaft 28. As shown in Fig. 18, this cam rotates to pull on the catch 145 and the connecting rod 139, and to thus draw the hammer 136 rearwardly until the catch is released, after which the hammer will swing forth violently under the contracting action of the spring 138, striking the head 135 of the pin 133, and moving the kick-out plate 132 outwardly to strike the previously printed article of mail matter and to eject it from the machine.

The printing head includes the structure 73 which is suitably designed to accommodate and be actuated by the cams 63. The bottom of the frame head 73 receives a pad of resilient material 150 against which a plate 151 is yieldably secured by a thin strip or strap 151a, which strap has extensions at both ends in the form of slotted clips 151b which fit loosely over pins 151c located in recesses at each end of the frame head 73 as shown in Figs. 23 and 25. Additional guiding and yielding means for plate 151 may be provided by the pins 152 and springs 152'. A printing plate 153 is fastened to the under face of the back plate 151, and is suitably etched or embossed to print a designed set impression. At one end of the printing head it is desired to print indicia which may be changed from time to time, thus requiring the use of a type holder 154. This type holder extends downwardly through a type pocket 155, which pocket is normally opened at both of its ends as seen in Fig. 21 of the drawings. The type holder 154, is substantially semicylindrical and is of composite construction, comprising the main member 156 and a clamping member 157. The two members may be fastened together by a set screw 158. The lower ends of the members are cut away to receive type 159 so that type may be clamped in position with relation to the type holder 154, and thereafter held so as to be aligned with the plane of the printing face of the plate 153. The type holder is prevented from turning by a key 160 which extends longitudinally of one side thereof, and fits within a key-way 161 as clearly shown in Fig. 25 of the drawings.

The upper end of the type holder is enlarged to provide a shoulder 162, which rests upon a shoulder 163 within the pocket 155, and thus limits the downward movement of the holder. The holder is reciprocably and yieldably mounted within the pocket 155 and is held in position by a compression spring 164 which rests upon the upper end of the holder and is forced downwardly by a threaded cap 165.

In order to conveniently set the type, a setting sleeve 166 is provided and is shown in Figs. 28 to 30, inclusive. This sleeve is adapted to receive the type holder when it has been removed from the pocket 155 in the printing head. A groove 167 is formed along one wall of the bore of the sleeve and receives a key 160 of the type holder. This insures that the head of the screw 158 will register with an opening 168 in the setting sleeve 166, and will permit the screw to be loosened. The interior of the sleeve 166 is cut away so that the clamp portion 157 of the type holder may move outwardly into the recess portion when the screw 158 is released, thus giving clearance for the type 159, and allowing them to be separated and removed, as viewed in Fig. 28 of the drawings.

The meter box unit is particularly disclosed in Figs. 2, 5, 6 and 7 of the drawings. The box is designed to enclose and protect a bank of cumulative counter dials 170 and a bank of dials 171 acting by diminution to subtract one unit from the sum total indicated by that bank of dials, said subtraction taking place at each actuation of the postal machine and being concurrent with the addition of a unit to the number indicated by the bank of dials 170. The dials 170 are mounted to freely rotate on a shaft 172 extending longitudinally of the machine in a plane above the master shaft 60 and parallel thereto.

A gear 173 is keyed upon the master shaft 60 and meshes with a pinion 174 carried by an intermediate shaft 175. This pinion engages a gear 176 which is secured to the first or unit dial of the bank of cumulative dials 170. Each of the dials in the bank is provided with a gear 177, which is in mesh with a complementary decimation pinion 178, free upon a shaft 179.

The gear ratio between the gears 177 and the pinions 178 is 1 to 10, so that one revolution of one pinion will bring about a one-tenth revolution of the next succeeding pinion, and so on throughout the bank of dials.

The bank of dials 171 is mounted upon a shaft 180, parallel to and in substantially the same plane as shaft 172 of the bank of dials 170. A gear 181 is secured to the unit dial of this bank and is in mesh with an intermediate pinion 182, carried on a shaft 183. The pinion in turn meshes with the gear 173 on the master shaft 60. Each of the dials of the bank 171 is provided with a gear 184 which meshes with a decimation pinion 185. The series of decimation pinions is mounted on a shaft 186 disposed parallel to the shaft 180, and by which arrangement it is insured that the successive dials will be moved by progression, and that at each actuation of the machine one unit will be stricken from the number indicated collectively by the dials.

It is desired that the dials of bank 171 may be optionally set by postal authorities to indicate an initial sum agreeing with the amount of postage being bought by the user of the postal machine, and the sum to indicate an equivalent number of stamps of a certain denomination. It is, therefore, necessary to provide means for instantly releasing all of the dials in bank 171 and permitting them to be set. This release is accomplished due to the fact that the pinion shaft 186 is mounted on a pair of oscillating arms 187. These arms are secured to move in unison and carried upon a pivot pin 188.

The axis of shaft 188 is parallel to the shaft 186 so that when the arms 187 are swung outwardly the pinions 185 will be moved out of mesh with the dial gears 184. One of the arms 187 has an upper extension which engages a wedge 189 carried upon the lid 190 of the meter box 26. This insures that when the lid of the box is locked in position there is no possibility of disengaging or rendering inoperative the dials in bank 171. As shown in Figs. 6 and 7 of the drawings, a spring finger 191 is provided and is brought to yieldably contact with the teeth of gears 184, when the pinions 185 are moved out of mesh with the gears 184.

A latch finger 192 is provided to engage the pinions 185 whenever the lid 190 is removed from the meter box 26. This finger is mounted upon the pivot shaft 188 of the arms 187 and is held by a spring 193 which tends to force the end of the finger 192 between the teeth of the pinions 185. An operating arm 194 is formed integral with the finger 192 and receives the lower end of a push rod 195, which rests upon it. The upper end of this rod is formed with a head 196 which normally extends above the plane of the under face of the lid 190 of the meter box 26, and will be forced downwardly when the meter box is closed, by its lid to then swing the finger 192 out of engagement with the pinions 185 and permit operation of the meter mechanism.

When the pinions 185 have been swung to a disengaging position with relation to the gears 184 the dials in bank 171 may be individually moved. This is accomplished by pressing downwardly upon buttons 197 arranged in a bank extending upwardly through the permanent cover 198 of the meter box. The buttons 197 are carried upon push rods 199 connected to operating levers 200, carried upon a pivot shaft 201. An operating pawl 202 is carried upon the outer end of each of the levers 200 and will mesh with the gears 184 so that upon each downward stroke of the push rod 199 the associated dial will be moved one increment. A spring 203 is disposed beneath each of the push buttons 197 and restores it and its associated mechanism to an inoperative position after each actuation.

It is desirable to insure that when the machine has been actuated until it has exhausted the amount of postage for which it has been set, the machine shall be automatically locked so that it will remain inoperative until set again by the postal authorities. This mechanism includes discs 204, one of which is associated with and fixed to rotate with each of the dials in the bank 171. A notch 205 is formed at a point on the circumference of the disc and registers with the numeral zero on the dial. Resting upon the circumferential edge of each of the discs 204 is a lock finger 206 having a downwardly extending point which will move into the notch 205 when the notch comes to register therewith. The lock fingers 206 are all keyed upon a lock shaft 207 so that the shaft cannot rotate until all of the notches 205 in the disc 204 are in register with their respective lock fingers 206. The shaft 207 is connected with a lock arm 208 shown in Fig. 8 of the drawings. This arm is adapted to swing into the path of a shoulder on a lock cam 209 which is keyed to the master shaft 60, adjacent the upright bearing member 23. A spring 210 normally tends to swing the end of the lock arm 208 in the path of travel of the shoulder of the lock cam 209.

In order to prevent reversal of rotation of the master shaft 60 by exerting pressure beneath the printing head or in some other uncontemplated manner, a pawl 211 is provided and engages teeth of gear 59; the point of engagement of these teeth being on the opposite sides of the master shaft 60, and in the opposite direction from the engagement of the lock arm 208 with the shoulder on the cam 209. A spring 212 tends to hold the point of the pawl 211 against the teeth of the gear 59 so that the pawl will ride over the teeth and will enter the space between the teeth in the event reverse rotation is attempted.

It is intended that the machine shall be locked within its casing so that unauthorized access to the meter and the operating parts of the machine may be prevented without detection. Access is permitted to the upper end of the printing head so that the type holder may be removed and the type interchanged. Access to the meter box and the interior of the casing is prevented by a lid lock 213 and a casing lock 214.

The casing 31 which houses the machine fits over the frame structure which includes the base 22 and the bearing uprights 23 and 24.

A bracket 215 is provided, as shown in Fig. 8 of the drawings, and is formed with an opening 216 through which the barrel 217 of the casing lock 214 may extend. This lock is preferably of the barrel type and is equipped at its rear end with a bolt 218, which when rotated assumes an eccentric position to prevent the removal of the lock and to thus fasten the casing and the bracket 215 together.

The lid 190 is provided along one of its edges with a hooked lip 219 which extends beneath a flange 220 formed along the edge of the casing. The opposite edge of the lid 190 fits snugly within the openings of the casing and the lid is then held in position by the lid lock 213. This lock is also preferably of the barrel type and has a cover 221 which swings outwardly to engage a lock flange 222 of the casing 31.

Sealing discs 223 and 224 are provided for the locks 213 and 214, respectively. These discs are mounted upon pivots 225 at one edge of the lock and may be swung to a position to conceal the entire lock and their free edge is provided with an outturned lock 226 which registers with a fastening bracket 227. Perforations in the lock and bracket register to receive a wire 228 of a lead seal 229.

It is to be understood that in addition to the enclosure formed by the case 31 the meter box is mounted within a double walled enclosure and is permanently covered so that even though the casing is mutilated and removed, the meter structure still remains in a concealed and protected condition.

The sets of dials may be observed through windows 230 in the permanent meter box cover 198, and the removable lid 190.

In operation of the machine the structure is assembled as shown in Fig. 1 of the drawings, and an article of mail matter may be positioned upon the platform 87 to overlie the platen 86, and to thus be disposed beneath the printing head 73. The handle 34 of the lever 33 may then be gripped and swung forwardly in the direction of the arrow "a", as indicated in Fig. 1 of the drawings. This action will rotate the operating shaft 28, and will simultaneously swing the radial arm 54 carried thereby; this structure being shown in Fig. 16 of the drawings, and the direction of movement of the arm being indicated by arrow "b" in that figure. This swinging movement will cause the pawl 55 to move downwardly and engage one of the teeth of ratchet 58 which stands in the obstructing position in the path of downward movement of the pawl 55. Attention is directed to the fact that the lower end of the pawl 55 is normally spaced some distance from the face of the adjacent tooth of the ratchet 58. During the interval of rotation permitted by the space represented between the point of the pawl and the adjacent ratchet tooth disc, the shaft 28 actuates the release cam 53 and the kick-out cam 149, as shown in Figs. 18 to 20, inclusive, of the drawings. The shoulder 52 of the release cam engages the point on the detent 50 and pulls the member 50 in the direction of the arrow "c" in Fig. 18. This will cause the lock lever 47 to swing in the direction of the arrow "d", as indicated in Fig. 18 of the drawings, and thus move the lug 46 from register with the opening 45 in the face of the gear 44. At the same time the shoulder 148 on cam 149 will engage the point 147 of the member 145 and will act through lever 142 and the draw bar 139 to draw the kick-out hammer 136 rearwardly and in the direction of the arrow "e", as indicated in Fig. 18 of the drawings. This action will be against the tension of spring 138 and will continue until the printing face of the printing head has started to rise from the contact with the article of mail matter which has been printed.

At substantially the same instant that the lock lug 46 has cleared the face of the gear 44, and has moved outwardly from register with the opening 45, the pawl 55, as shown in Fig. 16 of the drawings, will encounter the face of a tooth of the ratchet 58, and will begin to rotate the bevel gear 41 which is associated with the ratchet wheel 58. This rotation will be transmitted through gear 42 to the jack shaft 43, which shaft carries the spur gear 44. As shown in Fig. 8 of the drawings, the spur gear 44 meshes with the pinion 59 on the master shaft 60, and as the gear 44 rotates in the direction of the arrow "f" as shown in Fig. 8 of the drawings, the pinion 59 rotates in the direction of the arrow "g" as indicated in the same figure.

It is assumed that the dials of bank 171 have been so set as to cause the lock arm 208 to be held out of an obstructing position with relation to the shoulder on cam 209, thus permitting the master shaft to rotate.

It will also be understood that the lock pawl 211 is in engagement with the teeth of the pinion 59 to prevent reverse rotation of the shaft 60. The rotation of the shaft 60 causes simultaneous movement of the sleeve cams 62 and the printing head cams 63, which compose the printing unit. As the shaft rotates the cams 62 and 63 are swung in the direction of the arrow "h", as indicated in Fig. 9 of the drawings, and due to the design of cam 63 and the cam opening 73 within which it operates, the eccentric sleeve cam 62 will begin effective operation in advance of the cam 63. This will insure that immediately upon rotation of the master shaft 60, the sleeve 65 of the printing head will begin its downward travel toward the platen and to contact with the upper face of the article of mail matter to be printed. Simultaneous to this downward movement of the sleeve 65, the master shaft 60 actuates the cam 88 which relieves the downward pressure upon the lever arm 90 and causes the ink pad shifting lever 92 to swing rearwardly and upwardly in the direction of the arrow "i", as indicated in Fig. 2 of the drawings, and as brought about by the contraction of spring 98. The spring 98 and the roller 94 carried at the end of the lever 92 will thus act in the slot of the downwardly extending bracket 96 to retract the ink pad 74 and cause it to recede to a position within the body of the postal machine and at a point where it will be out of the path of travel of the downwardly moving sleeve 65, and the downwardly moving printing head 73. As the pad moves to this retracting position, the ink roller 79 dips into the ink compartment 78 and then rolls across the face of the ink pad 77 to apply a coating of ink thereon at each actuation of the machine. After the ink pad has receded to a position out of the path of travel of the downwardly moving sleeve 65, the sleeve will continue its movement until it contacts with the face of the article being printed, and thus disposes a metal wall entirely around the periphery of the area to receive the imprint of the printing head, and, in a manner to be inaccessible during the printing operation. It will be evident that the thickness of articles to be printed will vary and that in any event, the sleeve 65 will exert pressure on the article until it moves the upper face of the article into a fixed printing plane. This will insure that the remainder of the article must move to a position below that face, and this is accommodated by the yielding platen 86. Simultaneous with the yielding movement of the platen the lock wedge 117 moves forwardly so that it will lock the platen against downward movement at the time the platen is at the bottom of the stroke, and will thus preclude the possibility of prying the platen downwardly to remove an article of mail matter and to insert another article to be impressed with a postal permit surreptitiously.

As the article of mail matter is being moved with its upper face in register with the printing plane the cams 63 are rotating with the shaft 60 to force the printing head 73 downwardly and to cause the printing plate 153 to be forcefully pressed against the surface of the article being printed.

Attention is directed to Fig. 9 of the drawings, in which it will be seen that cushion springs 72 and 72' are disposed in the downward path of travel of the sleeve 65, and the printing head 73, to cushion this movement and to prevent violent operation of the machine which might result in damage to the parts.

When the shaft 60 has completed a one-half revolution the sleeve 65 and the printing head 73 will be in their lowermost positions and further rotation of the shaft with the cams 62 and 63 will retract the sleeve and head and cause them to ascend to a completely sealed position within the case of the postal machine, and in a plane considerably above the plane of the lower edge 231 of the overhanging portion of the case within which the printing head is housed. This makes it impossible for a piece of mail matter to be brought to register with the plate 153 of the printing head, even though the unauthorized user might have been successful in lowering the ink pad.

It will be understood that after the printing head is restored to its uppermost and inoperative position the cam 88 will force downwardly upon the lever 90, which in turn will act upon the shifting lever 92 and cause its roller 94 to move the bracket 96 forwardly, and force the ink pad 77 beneath the printing head and then upwardly until the face of the pad contacts forcibly with the plate 153 of the printing head. The degree of pressure exerted by the pad will be controlled by the regulating screws 105 and 106, as indicated in Figs. 13 and 14 of the drawings. This adjustment not only insures that the printing head will be properly inked, but also insures that the pad will be rigidly held against the plate 153 of the printing head to prevent unauthorized use of the machine.

Attention is also directed to the fact that when the pad is in its position of register with the printing plate 153 of the printing head, the frame 75 of the pad extends upwardly and along the perimeter of the printing plate, so that the face of the printing plate will be below the level of the upper edge of the frame 75 and will be effectively guarded thereby.

When the printing operation is completed, and just prior to the return of the ink pad to its position of register beneath the printing head, the cam 149, as shown in Figs. 18 to 20, inclusive, of the drawings, moves to a position to release the member 145, and will thus permit the tension spring 138 to swing the kick-out hammer 136 forwardly, striking the head 135 of pin 133 and violently forcing the plate 132 against the edge of the article of printed matter to eject it from the machine, thus preparing the machine for the return operation of the ink pad to its inking and guarding position.

The non-reversing mechanism is in operation at all times during the rotation of the shaft 28 in either direction. This mechanism has been previously described, and is shown in Fig. 17 of the drawings, where it will be seen that the arm 36 keyed upon the shaft 28 swings in the direction of the arrow "j", in the same figure, during the advance portion of the operating stroke of the lever 33, and that it swings in a counter-direction during the return stroke of the lever 33. As the arm 36 operates it will cause the knurled pawl 37 to ride over the knurled face of the arcuate member 40 until it reaches the end of the arcuate member, after which the pawl will pass out of contact with the knurled face of the arcuate member and will then be free to follow the arm as it swings backwardly along its return course. It will be evident that the shaft 28 cannot be arrested in its rotation and restored to its original position without a complete actuating operation; as for example; it will be impossible to start reverse motion of the pawl 37 and arm 36 from the position indicated by dotted lines in Fig. 17 of the drawings.

The postal machine may be operated until the bank of dials 171 have been actuated to exhaust the number of unit actuations for which the dials have been set by the postal authorities. When all of the dials of bank 171 move to zero the levers 206 will swing downwardly to register with the notches 205 in the disc 204. This will cause the spring 210 to swing the lock arm 208 inwardly into an obstructing position with relation to the cam 209 on the shaft 60. The lock arm 208 and the non-reversing pawl 211 will thus hold the gear 59 and the shaft 60 against rotation in either direction.

It will be necessary to take the machine to the proper postal authorities for resetting, before the machine will operate.

The resetting operation may be brought about by breaking the seal 229 on the lock plate 223 and thereafter unlocking the lock structure 213. This will permit removal of the lid 190 of the case. The lock arm 208 may then be swung outwardly by operation of a lever 232, carrying a push button 233, which extends upwardly through the permanent cover 198 of the meter case 26.

Before the dials may be set the supporting arms 187 of the pinion shaft 186 must be swung outwardly to cause the pinions 185 to move out of mesh with the gears 184 of the dials in bank 171. This will permit these gears to be free, after which the push buttons 197 may be operated to set the dials for a sum representing the unit operations for which the machine may be operated by Government permit.

Attention is directed to the fact that while the cover 190 is removed from the case 31, the push rod 195 is released, and will cause the lock finger 192 to engage the teeth of the pinions 185 and prevent the rotation thereof. After the dials have been properly set the pinions 185 may be swung into register with the gears 184 and will be released for operation, when the cover 190 is replaced upon the case, and the push rod 195 is engaged by the cover to swing the lock finger 192 out of an obstructing position with relation to the teeth of the pinions 185.

By reference to Fig. 6 of the drawings, it will be seen that the lock wedge 189 on the cover 190 engages the upper extending end of one of the bearing arms 187 and holds the pinions 185 in a locked position with relation to the gears 184 at all times.

At times it will be desirable to remove the case 31 from the machine to permit access to the parts thereof, and in that event the lock 214 may be removed, after breaking the seal 229. This will permit the case to be lifted from its assembled position with relation to the main frame. In some instances it may be desirable to have a catch 234 to engage the opposite side of the case, as shown in Fig. 12 of the drawings.

A modified form of the invention is shown in Figs. 31 to 50, inclusive. In the structure there shown means are provided to repeat the printing of the permit upon an article of mail matter in order to increase the value of the permit in proportion to the postage required for mailing. In this structure a permit may be printed one time and thereafter shifted to be printed the second time. At each printing the meter will be successively actuated to subtract the postage from that for which the machine is set in proportion to the number of actuations of the meter. The structure shown in Figs. 31 to 50 of the drawings also discloses a different form of inking means, whereby a roller passes across the face of the type to apply ink thereto.

Referring more particularly to these figures, 235 indicates the multiple printing head. This includes an outer sleeve 236 of rectangular section, within which a printing block 237 reciprocates. The sleeve and the block are actuated by the cams 62 and 63, as described in the other form of the invention.

Referring particularly to Figs. 39 and 40 of the drawings, it will be seen that the printing block 237 is provided with a sleeve 238, having a vertical bore therethrough to receive a type-holder 239 of the general construction previously disclosed in Fig. 22 of the drawings. A pin 240 carried by the sleeve 239 registers within a longitudinal slot 241 in the type head and prevents rotation of the sleeve. The type-holder 239 has a shoulder 242 at the upper end thereof to limit its downward motion, while an expansion spring 243 holds the shoulder in position within the sleeve 238. An upwardly extending pin 244 is secured to the type-holder 239 and projects through an opening 245 in a cover cap 246, as more particularly shown in Fig. 42 of the drawings.

The lower face of the sleeve 238 carries a printing plate 247 upon which certain indicia is inscribed, such for example, as the name of the originating post office. The type-holder carries type which may give the date of mailing. In the printing structure shown particularly in Fig. 21 of the drawings there was only one printing plate to engross the permit data upon the article of mail matter. In the present form of the invention it is desirable that the printing plate shall be shiftable so that when affixing a permit in a pre-determined relation to the data printed by the sleeve 238 and the type-holder 239, the permit will indicate that a certain amount of postage has been paid, and when this section of the printing head has been shifted to engross the permit a second time upon the article of mail matter, the value of the postage accounted for by the machine will be doubled.

It will of course be understood that this idea may be amplified to increase the amount of postage accounted for many times more than twice. The shifting print element is indicated at 248 in Figs. 39, 40 and 43 of the drawings, where it will be seen that a base 249 is formed with overhanging flanges 250, which reciprocate horizontally along guideways 251 in the printing head 237. These overhanging flanges continue as forked end fingers 252, which may straddle the sleeve 238 and register with grooves 253 therein to raise the sleeve and the typeholder carried thereby to be clear of their contacting position with the printed surface when the permit indicia is made by member 248 the second time. A recess 254 is formed in the upper face of the type-holder 248 and receives the spherical end 255 of a shifting lever 256. This lever is pivoted intermediate its ends upon a pin 257 and extends in a central vertical slot 258 as shown in Fig. 41 of the drawings. The upper end of the shifting lever 256 is fitted with a spherical end 259, which extends into a slot 260 of a setting lever 261, which extends horizontally above the printing head, and is pivotally secured upon a screw 262 of the printing head frame.

A hairpin spring 263 normally holds the lever 261 in a position to dispose a printing unit 248 as shown in Fig. 39 of the drawings. When this lever is operated to swing it to the positions indicated in Figs. 44 and 45 of the drawings, the shifting printing member 248 will be moved to the position indicated in Fig. 40 of the drawings.

It will be assumed that the permit is for a two cent (2¢) unit of postage and that the shifting lever will stand in register with the numeral two (2) inscribed on the case and indicated in Fig. 45 of the drawings. When the shifting lever is moved to register with the numeral 4, as inscribed in Fig. 45 of the drawings, the printing may be repeated with the printing element 248 in its shifted position. It is desirable to automatically restore the shifting lever and the printing unit 248 to their initial position whereby the lower unit of postage will be used. In order to accomplish this, the structure shown in Figs. 46 to 50 is provided. Here it will be seen that the shifting lever 261 carries a pawl 264 mounted upon a pin 265. The end of the lever is formed with a tubular extension 266, through which a push rod 267 is mounted. The push rod connects with a fork 268 moving along the elongated slot 260. The spring 269 acts to keep the rod 267 and fork 268 in the positions indicated in Fig. 47. Longitudinal slots 270 and inclined slots 272 are formed in the arms of fork 268. The pin 265 passes through the slots 270 and serves as a guide for the arms of the fork. The pawl 264 is disposed on pin 265 between the fork arms and carries the pin 273 which engages in the slots 272 of the fork arms. The end of the pawl is pivotally mounted upon the pin 265 so that when the fork shifts back and forth the pin 273 may ride along the inclined slots 272 and rest or lower the pawl, as the case may be. Under normal conditions the lower face of the shifting lever 261 is flush with the upper face of the printing head, thus causing the pawl 264 to be lifted, as shown in Fig. 50 of the drawings. Under these conditions the shifting lever will remain set at its lowest value of postage and its spring 263 will hold it in position. In the event that the shifting lever 261 is set to increase the amount of postage the push rod 267 will be actuated by spring 269 and this will tend to move the pawl downwardly to the positions indicated in Figs. 48 and 49, at which time the pawl will engage locking angle 274 and will be held in its set position until the printing head arises.

The printing block 237 is formed with a recess near its upper end to receive a pawl 275 normally held in its outermost position by a spring 276. When the sleeve 236 has moved below the position of the pawl 275, it will swing outwardly and remain so until the printing head is lifted, at which time it will move upwardly as indicated in Fig. 49 of the drawings, and will lift the pawl 264 so that the shifting lever 261 may swing free of the lock member 274 and return to its original position. The pawl 275 has an eccentric face on its outer edge, normally extending into the path of travel of the printing head sleeve 236, so that as the sleeve arises it will swing the pawl inwardly to a non-obstructing position as far as on the shifting lever 261 is concerned. This position is indicated in Fig. 48 of the drawings.

Figs. 31 and 32 show another form of the inking means. This comprises a pair of lever arms 277 mounted upon pivots 278, and the opposite sides of the guide members 279 for the printing head. Journal boxes 280 are reciprocably mounted at the lower end of the arms and receive trunnions 281 of the inking roller 282. This roller is intended to pass over and roll against the printing face of the printing head in the interval directly preceding the printing operation. The journal boxes 281 are yieldably held by springs 283, which cause the roller to yieldably and forcibly hold against the surface to be inked. An ink reservoir 284 is secured within the housing of the postal machine and is fitted with an inking brush 285 at its lower end. This will therefore be a fountain brush which normally contacts with the roller 282 and applies ink to its circumferential face. Operating pins 286 are secured at opposite sides of the printing head sleeve 236 and move upwardly to engage a trip finger 287, which will swing the levers 277 and the ink roll outwardly to contact with the ink brush 285. These pins will also move the lever arms as they travel downwardly since the pins will move downwardly along the inclined edge 288 of the levers 277.

In Figs. 10 and 11 of the drawings the platen 80 is shown as being provided by means with which it may be locked against retraction after the piece of mail matter to be printed has become adjusted to the printing head. In the modification here shown the platen is of slightly different construction and is more positively locked.

Referring to Figs. 31 and 32 of the drawings, it will be seen that the platen comprises an outer frame structure 289 having a downwardly extending marginal wall on three sides, projecting into a slot 290. A central opening 291 is formed through the frame structure to receive a resilient platen face 292. A yieldable pressure plate 293 is disposed beneath the member 292 and a rubber packing member 294 is interposed between an overhanging flange of the platen frame 289 and outwardly projecting flange of the platen plate 283. A pressure lever 295 rests against the underface of the platen plate 293. This lever is pivoted in the base of the machine at 296 and has an extension 297 through which a push rod 298 extends. This rod carries a free collar 299 against which a compression spring 300 rests and which member circumscribes the rod 298. A collar 301 is pinned to the rod 298 at its upper end. This rod reciprocates through a bearing 302 and is engaged at its upper end by a cam 303, which exerts downward pressure upon it and swings the lever 295 through compression of pressure exerted through the spring 300.

A pair of guide pins 304 extend upwardly from the base plate 305 of the machine and into opening 306 of the platen frame 289. This prevents removal of the frame by sidewise motion. Inner pins 307 are carried by the marginal edge of the frame 289 and their upward movement is limited by the over-hanging ledge of the plate 305 so that the platen cannot be removed.

In order to prevent the platen from being depressed against the pressure of the spring 300, lock wedges 308 are carried upon a fork 309 and are horizontally reciprocated by a lever 310 pivoted to the fork at 311. The lever is in shape of a bell crank and the lever 310 is pivotally mounted upon a pin 312, and the opposite leg of the lever, as indicated at 313, extends forwardly and rests against a cam 314. A spring 315 normally swings the lever to shift the fork beneath the platen and to wedging positions so that the platen frame cannot be forced downwardly during the printing operation.

It will thus be seen that the postal machine here disclosed not only provides a structure which may be operated without tampering, and which may be recommended and relied upon by the postal authorities when placed in the hands of accredited users, but also provides a structure which is simple in construction, is not liable to get out of order, and will act directly and repeatedly to fix postal data upon articles of mail matter in lieu of postage.

While I have shown the preferred form of my invention as now known to me, it will be understood that various changes may be made in the combination, construction and arrangement of parts by those skilled in the art, without departing from the spirit of the invention as claimed.

Having thus described my invention what I claim and desire to secure by Letters Patent is:

1. A postal machine comprising a printing head adapted to move toward and away from a platen, a master shaft, operating means carried by the master shaft for actuating said head, means for locking the master shaft against rotation, a jack shaft, normally idle gear means operatively disposed between the jack shaft and the main shaft and means carried upon the jack shaft for initially unlocking the main shaft and for then actuating said gear means to rotate the main shaft.

2. A postal machine comprising a printing head adapted to move toward and away from a platen, a master shaft, operating means carried by the master shaft for actuating said head, means for locking the master shaft against rotation, a jack shaft, normally idle gear means operatively disposed between the jack shaft and the main shaft and means carried upon the jack shaft for initially unlocking the main shaft and for then actuating said gear means to rotate the main shaft, and means making it necessary to complete the cycle of operation of the shafts after any portion of rotation of a shaft is initiated.

3. A postal machine comprising a reciprocating printing head, a master shaft, a cam carried by the master shaft for reciprocating said head, a jack shaft, a normally inactive gear train between the jack shaft and the master shaft, means normally locking the gear train to prevent rotation of the master shaft, and means carried by the jack shaft operating consecutively to initially unlock the gear train and to then drive the same to produce rotation of the master shaft and a cycle of operation of the printing head.

4. A postal machine comprising a reciprocating printing head, a master shaft, a cam carried by the master shaft for reciprocating said head, a jack shaft, a normally inactive gear train between the jack shaft and the master shaft, means normally locking the gear train to prevent rotation of the master shaft, and means carried by the jack shaft operating consecutively to initially unlock the gear train and to then drive the same to produce rotation of the master shaft and a cycle of operation of the printing head, and means preventing counter rotation of the master shaft at all times.

5. A postal machine comprising a vertical reciprocating printing head, a platen disposed therebeneath, a cam adapted to move said head toward and away from the platen in a printing operation, a master shaft carrying the cam and disposed in a plane at right angles to the plane of movement of the printing head, a gear permanently keyed to the master shaft, a driving gear in mesh therewith, and keyed upon a stub shaft, a second gear keyed on the stub shaft, a jack shaft, a gear freely mounted upon said jack shaft and in constant mesh with the second gear on the stub shaft, means for rotating the jack shaft and means carried thereupon for positively rotating the gear thereon, after a pre-determined partial rotation of the shaft.

6. A postal machine comprising a vertical reciprocating printing head, a platen disposed therebeneath, a cam adapted to move said head toward and away from the platen in a printing operation, a master shaft carrying the cam and disposed in a plane at right angles to the plane of movement of the printing head, a gear permanently keyed to the master shaft, a driving gear in mesh therewith, and keyed upon a stub shaft, a second gear keyed on the stub shaft, a jack shaft, a gear freely mounted upon said jack shaft and in constant mesh with the second gear on the stub shaft, means for rotating the jack shaft and means carried thereupon for positively rotating the gear thereon, after a pre-determined partial rotation of the shaft, means locking the master shaft against rotation in an advance direction and means whereby said master shaft will be unlocked during said partial rotation of the jack shaft and while the gear thereon is inoperative.

7. A postal machine comprising a vertical reciprocating printing head, a platen disposed therebeneath, a cam adapted to move said head toward and away from the platen in a printing operation, a master shaft carrying the cam and disposed in a plane at right angles to the plane of movement of the printing head, a gear permanently keyed to the master shaft, a driving gear in mesh therewith, and keyed upon a stub shaft, a second gear keyed on the stub shaft, a jack shaft, a gear freely mounted upon said jack shaft and in constant mesh with the second gear on the stub shaft, means for rotating the jack shaft and means carried thereupon for positively rotating the gear thereon, after a pre-determined partial rotation of the shaft, and means constantly preventing counter rotation of the master shaft.

8. A postal machine comprising an operating mechanism, a case within which said operating mechanism is locked, a shaft of said operating mechanism extending through the end wall of said case, a printing head mounted upon said outer extending end of said shaft and reciprocated thereby, and an ink pad normally fitting against the printing face of said printing head and adapted to be retracted through an opening in the end wall of said case as the printing head moves downwardly.

9. A postal machine comprising a base, a vertical end wall extending upwardly therefrom, a vertical wall extending upwardly therefrom intermediate the ends of the base, a drive shaft mounted in bearings and extending through said walls, said drive shaft extending forwardly of the intermediate wall, a platen mounted upon the end of the base projecting from the intermediate wall, a printing head mounted upon the end of the drive shaft projecting over said platen, operating means for the shaft disposed between said walls, a removable case fitting over the portion of the base structure included between the vertical walls thereof and cooperating with said walls in completely encasing the operating mechanism, and a fixed hood enclosing the sides and top of the printing head while the printing head is in its retracted position.

10. A postal machine comprising a base, a vertical end wall extending upwardly therefrom, a vertical wall extending upwardly therefrom intermediate the ends of the base, a drive shaft mounted in bearings and extending through said walls, said drive shaft extending forwardly of the intermediate walls, a platen mounted upon the end of the base projecting from the intermediate wall, a printing head mounted upon the end of the drive shaft projecting over said platen, operating means for the shaft disposed between said walls, a removable case fitting over the portion of the base structure included between the vertical walls thereof and co-operating with said walls in completely encasing the operating mechanism, and a fixed hood enclosing the sides and top of the printing head while the printing head is in its retracted position, and an ink pad normally enclosed by said hood and operatively connected with the operating mechanism to be retracted to a position through the intermediate wall and within the hood during the interval of printing operation.

11. A postal machine comprising a base, a vertical end wall extending upwardly therefrom, a vertical wall extending upwardly therefrom intermediate the ends of the base, a drive shaft mounted in bearings and extending through said walls, said drive shaft extending forwardly of the intermediate wall, a platen mounted upon the end of the base projecting from the intermediate wall, a printing head mounted upon the end of the drive shaft projecting over said platen, operating means for the shaft disposed between said walls, a removable case fitting over the portion of the base structure included between the vertical walls thereof and co-operating with said walls in completely encasing the operating mechanism, and a fixed hood enclosing the sides and top of the printing head while the printing head is in its retracted position, and a removable cover in the top of the hood permitting access to the printing head without permitting access to the operating mechanism.

12. A postal machine comprising a base, a vertical end wall extending upwardly therefrom, a vertical wall extending upwardly therefrom intermediate the ends of the base, a drive shaft mounted in bearings and extending through said walls, said drive shaft extending forwardly of the intermediate walls, a platen mounted upon the end of the base projecting from the intermediate wall, a printing head mounted upon the end of the drive shaft projecting over said platen, operating means for the shaft disposed between said walls, a removable case fitting over the portion of the base structure included between the vertical walls thereof and co-operating with said walls in completely encasing the operating mechanism, and a fixed hood enclosing the sides and top of the printing head while the printing head is in its retracted position, and an ink pad normally enclosed by said hood and operatively connected with the operating mechanism to be retracted to a position through the intermediate wall and within the hood during the interval of printing operation, and a meter secured within the case with the operating mechanism and actuated thereby.

RALPH G. WHITLOCK.